United States Patent
Peters et al.

(10) Patent No.: US 7,483,571 B2
(45) Date of Patent: Jan. 27, 2009

(54) APPARATUS AND METHOD FOR THE CONSTRUCTION OF SPATIAL REPRESENTATIONS

(76) Inventors: Mark W. Peters, 91 Wyaolra Avenue, Northmanly, NSW (AU) 2100; Barry J. Drake, 31221 Trafalgor Street, Stanmore, NSW (AU) 2048

( * ) Notice: Subject to any disclaimer, the term of this patent is extended or adjusted under 35 U.S.C. 154(b) by 910 days.

(21) Appl. No.: 10/168,922

(22) PCT Filed: Oct. 30, 2001

(86) PCT No.: PCT/AU01/01392

§ 371 (c)(1),
(2), (4) Date: Nov. 13, 2002

(87) PCT Pub. No.: WO02/37419

PCT Pub. Date: May 10, 2002

(65) Prior Publication Data

US 2003/0179922 A1    Sep. 25, 2003

(30) Foreign Application Priority Data

Oct. 30, 2000 (AU) .................................... PR1129
Jul. 27, 2001 (AU) .................................... PR6616

(51) Int. Cl.
*G06K 9/76* (2006.01)
(52) U.S. Cl. .................... 382/211; 74/5 R; 74/5.6 D; 341/155
(58) Field of Classification Search ................ 382/211, 382/106, 103, 109; 74/5 R, 5.47, 5.6 D; 341/155, 341/169; 180/446; 219/492, 521; 348/36, 348/61, 135, 153, 159; D13/103
See application file for complete search history.

(56) References Cited

U.S. PATENT DOCUMENTS 3,840,586 A * 10/1974 Kawai et al. ................ 560/147

(Continued)

FOREIGN PATENT DOCUMENTS

CA    2309008 A    11/2000

(Continued)

OTHER PUBLICATIONS

M. Peters & B. Drake, "Jigsaw: the unsupervised construction of spatial representations", Technical Report UNSW-CSE-TR-0007, Nov. 2000, pp. 1-74, University of New South Wales.

(Continued)

*Primary Examiner*—Sheela Chawan
(74) *Attorney, Agent, or Firm*—Seyfarth Shaw LLP

(57) ABSTRACT

A method and apparatus for constructing spatial representations of referents is provided. The method and apparatus have application in any area where a spatial representation of a referent is required. Examples are image processing and machine vision. In image processing the "referents" are signal sources which are being viewed by an image processing sensor, eg CCD array. The image sources will be points in a scene, for example. Currently available image systems must be aware of the relative positions of the image sensors. In prior art image systems, this information is usually provided a priori. In the present invention, no a priori information on the arrangement of the image sensors is required. Instead, a geometrical representation of the referents is produced by obtaining signals from the referents and utilizing the signals in order to provide the geometrical representation. The geometrical representation is built up purely from the signals provided by the sensors themselves. The invention assumes that behavioral differences between signals for any two referents imply a distance between the referents, and this assumption is utilized in order to build up the geometrical representation of the referents.

92 Claims, 27 Drawing Sheets

U.S. PATENT DOCUMENTS

| | | | |
|---|---|---|---|
| 4,764,944 A * | 8/1988 | Finlayson | 378/20 |
| 4,998,005 A | 3/1991 | Rathi et al. | |
| 5,063,604 A * | 11/1991 | Weiman | 382/170 |
| 5,497,188 A * | 3/1996 | Kaye | 348/36 |
| 5,525,901 A * | 6/1996 | Clymer et al. | 324/207.21 |
| 5,875,264 A * | 2/1999 | Carlstrom | 382/181 |
| 5,877,803 A | 3/1999 | Wee et al. | |
| 5,927,415 A * | 7/1999 | Ibaraki et al. | 180/65.2 |
| 6,133,826 A * | 10/2000 | Sparling | 340/436 |
| 6,195,122 B1 * | 2/2001 | Vincent | 348/169 |

FOREIGN PATENT DOCUMENTS

| | | |
|---|---|---|
| EP | 0952551 A | 10/1999 |
| EP | 1052848 A | 11/2000 |
| EP | 1054340 A | 11/2000 |
| WO | WO 94/28375 A | 12/1994 |
| WO | WO 99/49277 | 9/1999 |
| WO | WO 00/03543 | 1/2000 |

OTHER PUBLICATIONS

M. Peters & B. Drake, "Fundamental robust self-organising vision", $4^{th}$ Australia-Japan Joint Workshop on Intelligent and Evolutionary Systems, Oct. 31, 2000 - Nov. 2, 2000, pp. 1-8, University of New South Wales.

M. Peters, "Spatial Competence via Self-Organisation: an Intersect of Perception and Development", Cognitive Science, 1998, pp. 1-6, University of New South Wales.

P. Prokopowicz & P. Cooper, "Integrating Visual Information Across Camera Movements with a Visual-Motor Calibration Map", Conference of the American Association for Artificial Intelligence, 1996, pp. 1-8, University of Chicago & Northwestern University.

P. Prokopowicz & P. Cooper, "IRV: Learning to Integrate Visual Information Across Camera Movements", International Joint Conference on Artifical Intelligence, 1995, pp. 1-2, vol. 2, University of Chicago & Northwestern University, Illinois.

C. Torras, "Neuroadaptive Robots", Institut de Robotica i Informatica Industrial, Sep. 3, 2000, pp. 172-177, vol. 2, Barcelona.

JIGSAWSOLUTIONS, "C-SAW Explained" [Online], Oct. 20, 2005, Retrieved from the Internet: www.jigsawsolutions.org.

* cited by examiner

FIG. 5A
THE ab CURVE FORM 192x128 IMAGE
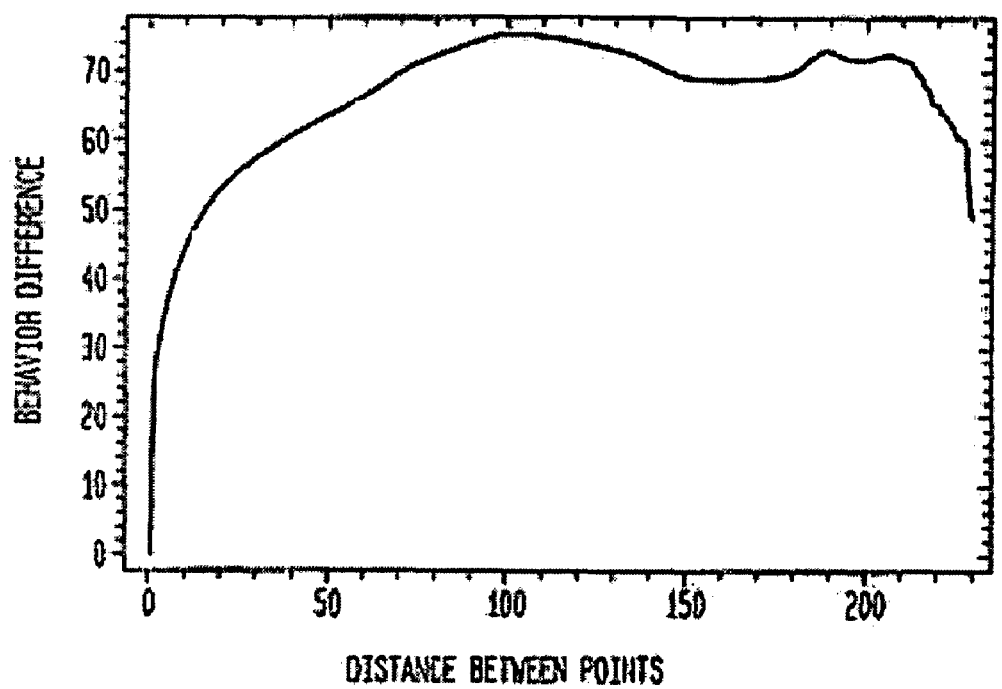
GOSSE BLUFF SMALL - 192x128, RANGE=241

FIG. 5B
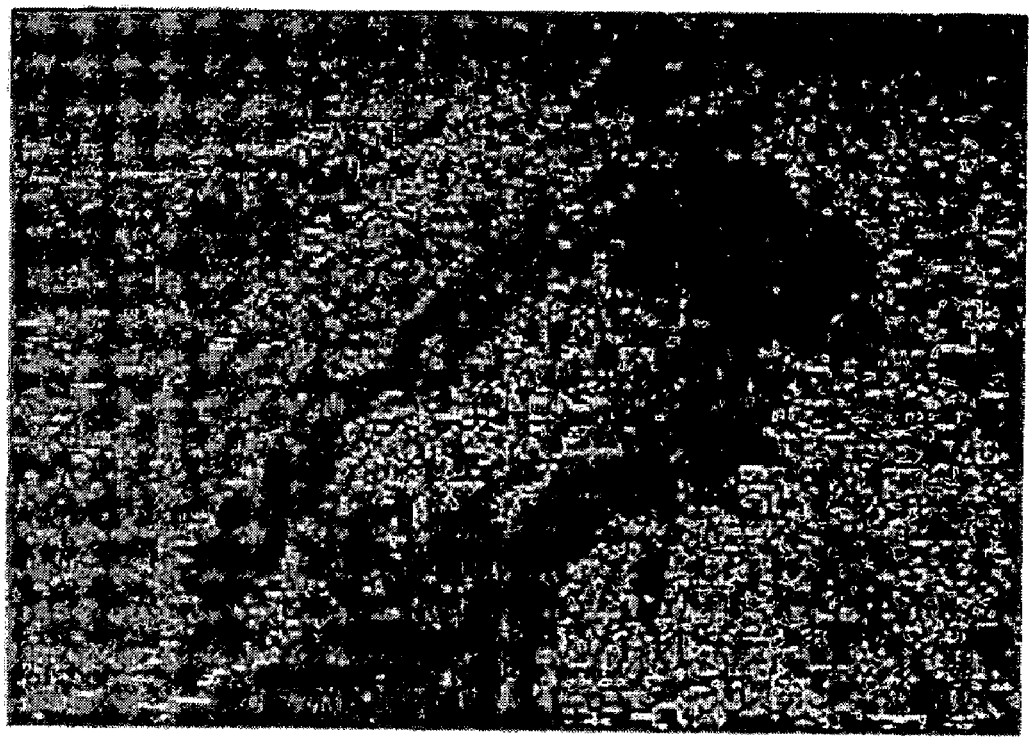
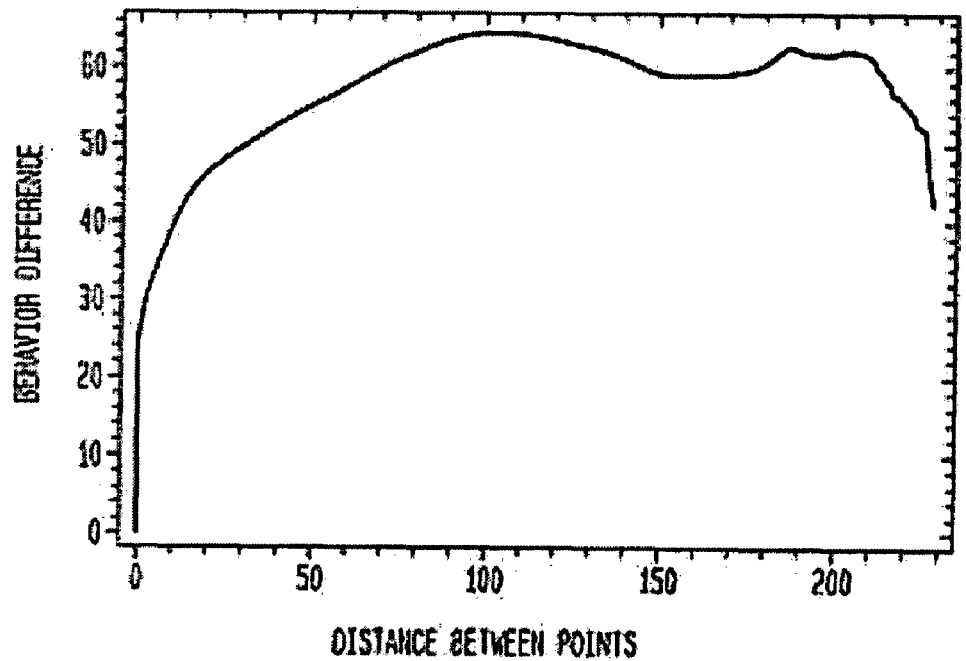
GOSSE BLUFF SMALL C1 - 192x128, RANGE=206

FIG. 5C
THE ab CURVE FOR 192x128 IMAGE
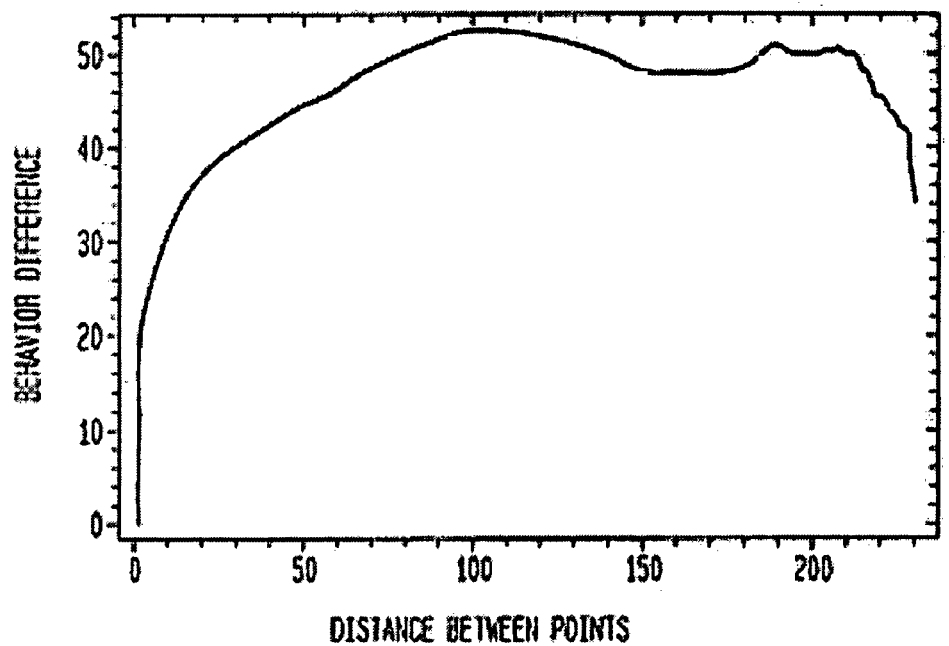
GOSSE BLUFF SMALL C2 - 192x128, RANGE=170

FIG. 5D
THE ab CURVE FORM 192x128 IMAGE
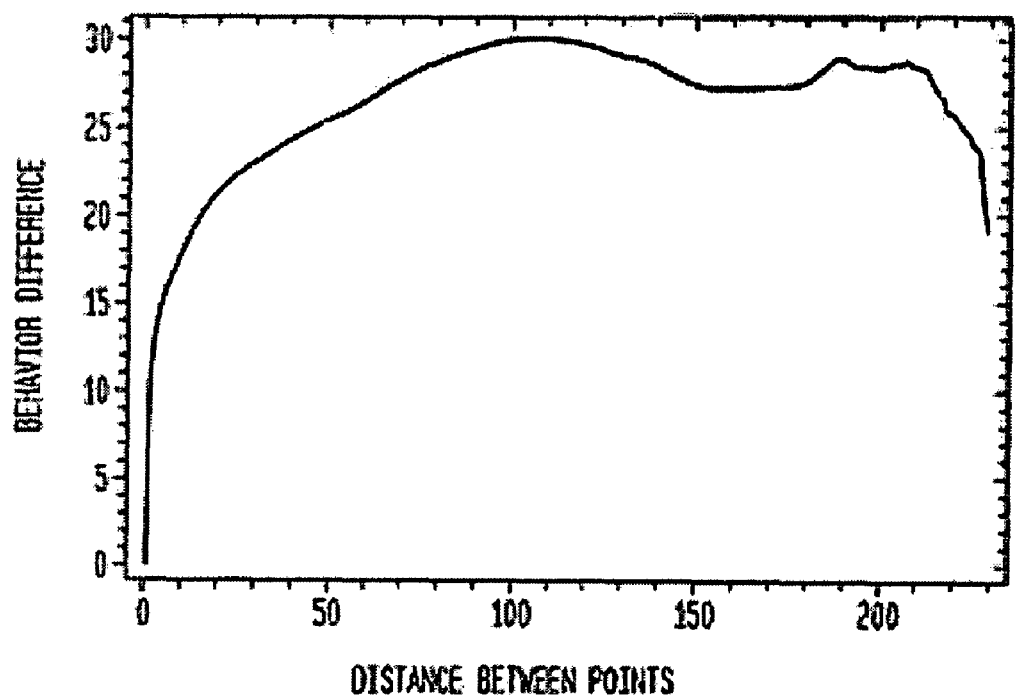
GOSSE BLUFF SMALL C3- 192x128, RANGE=98

FIG. 6A
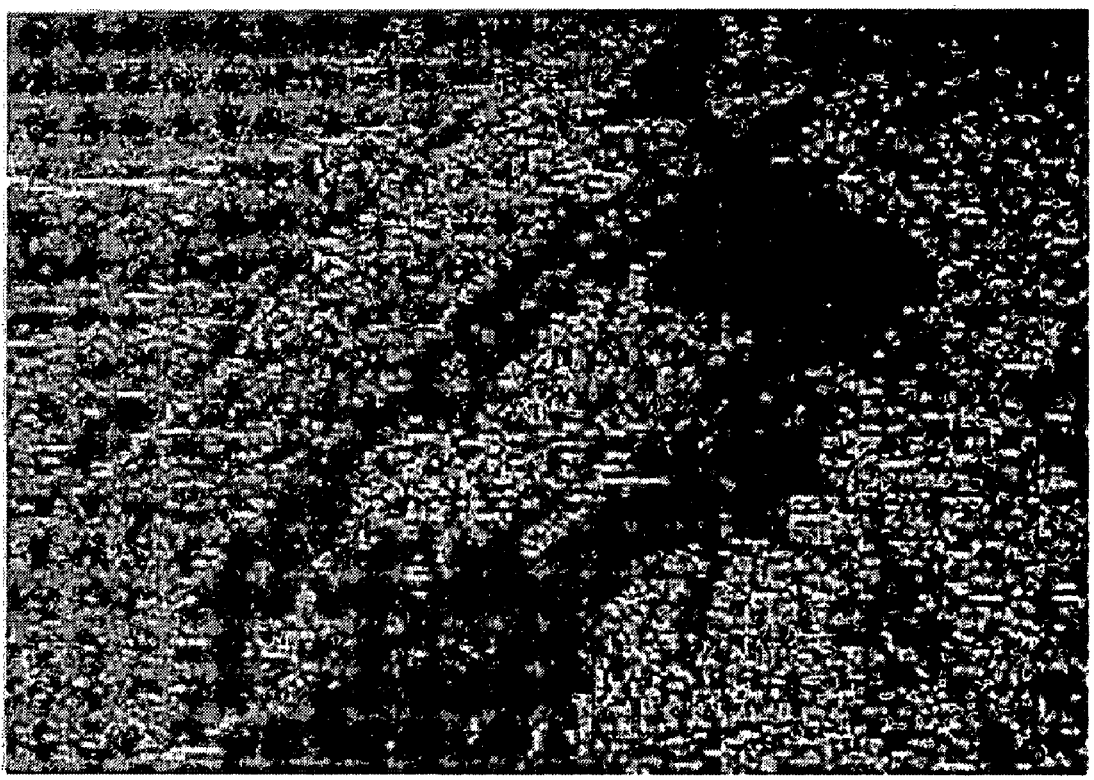
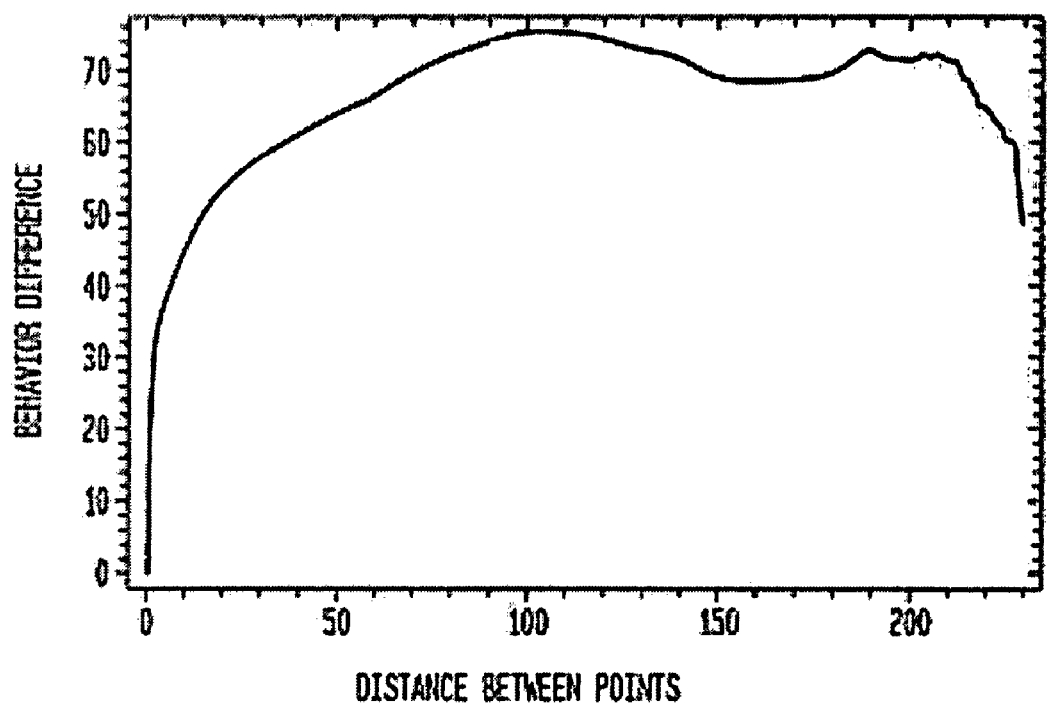
GOSSE BLUFF SMALL - 192x128, RANGE=241

FIG. 6B
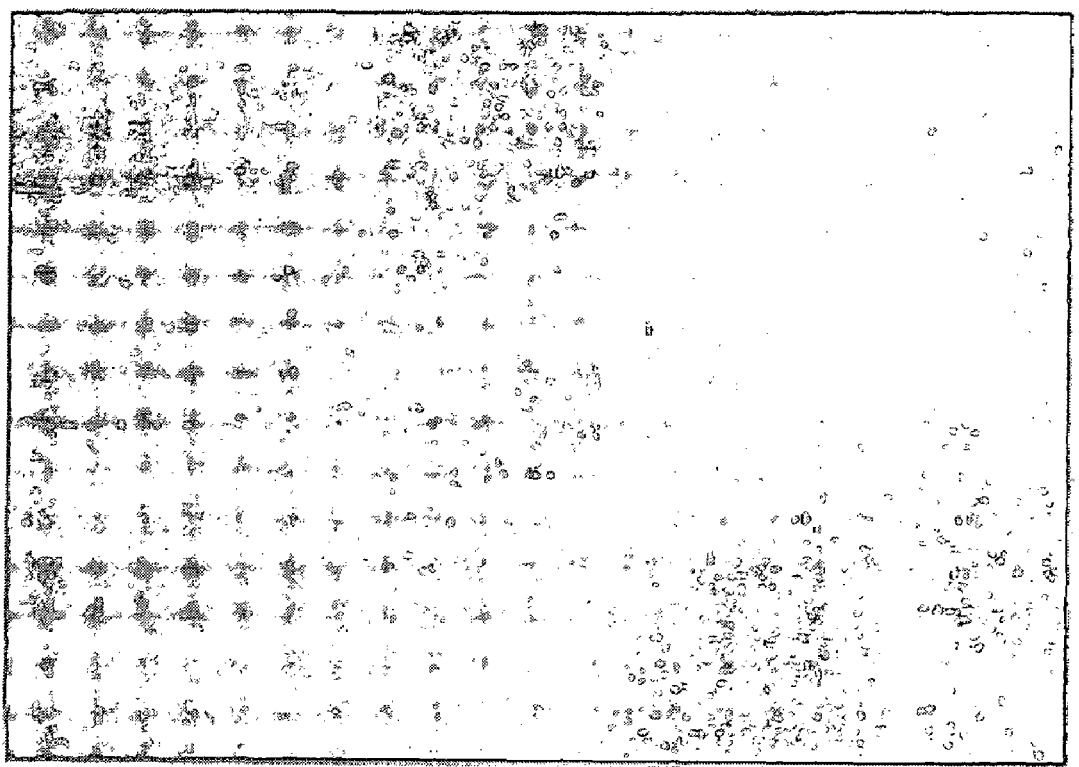
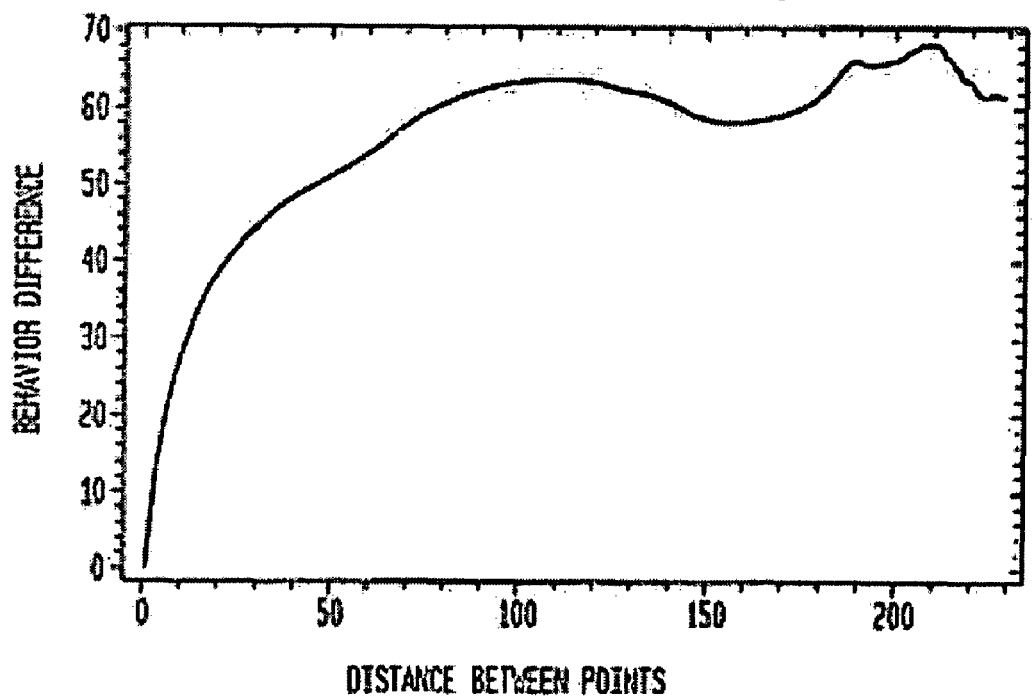
GOSSE BLUFF SMALL B1- 192x128,RANGE=217

FIG. 6C
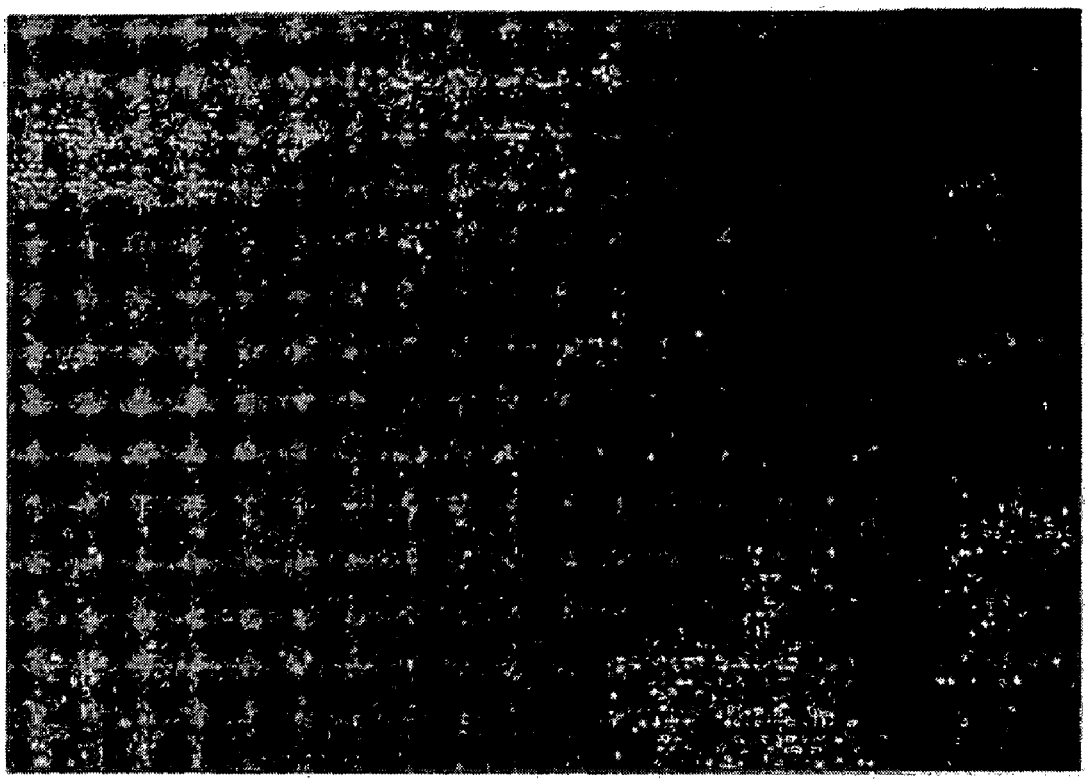
THE ab CURVE FORM 192x128 IMAGE
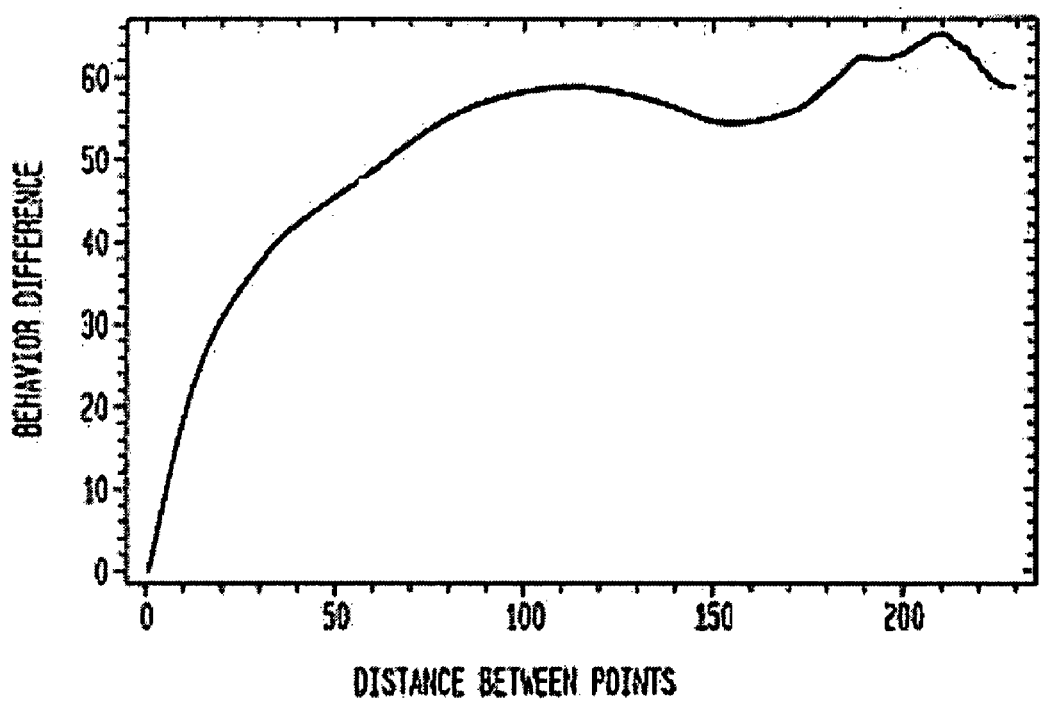
GOSSE BLUFF SMALL B2- 192x128.RANGE=196

FIG. 6D
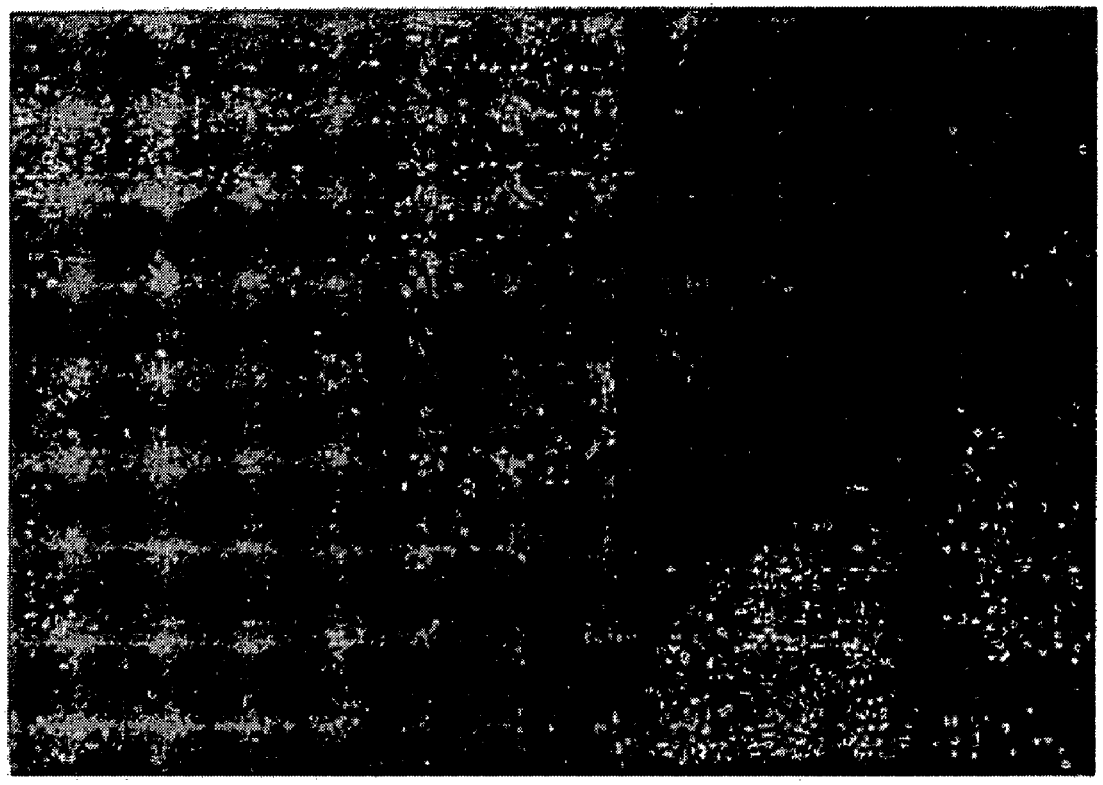
THE ab CURVE FORM 192x128 IMAGE
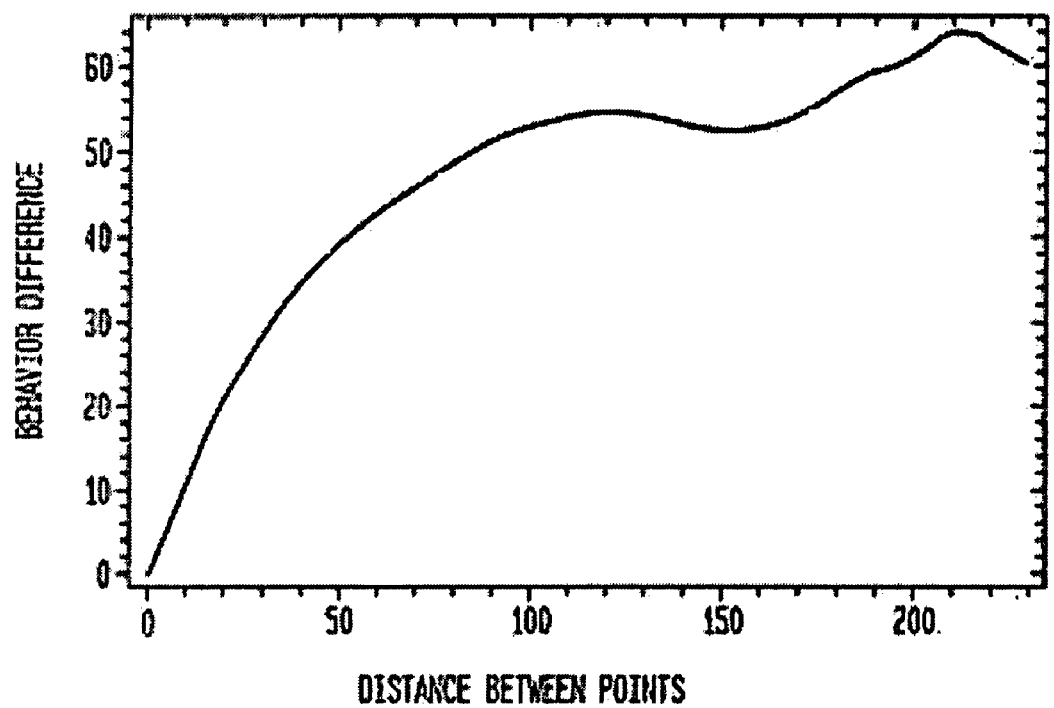
GOSSE BLUFF SMALL B3- 192x128, RANGE=174

FIG. 7A
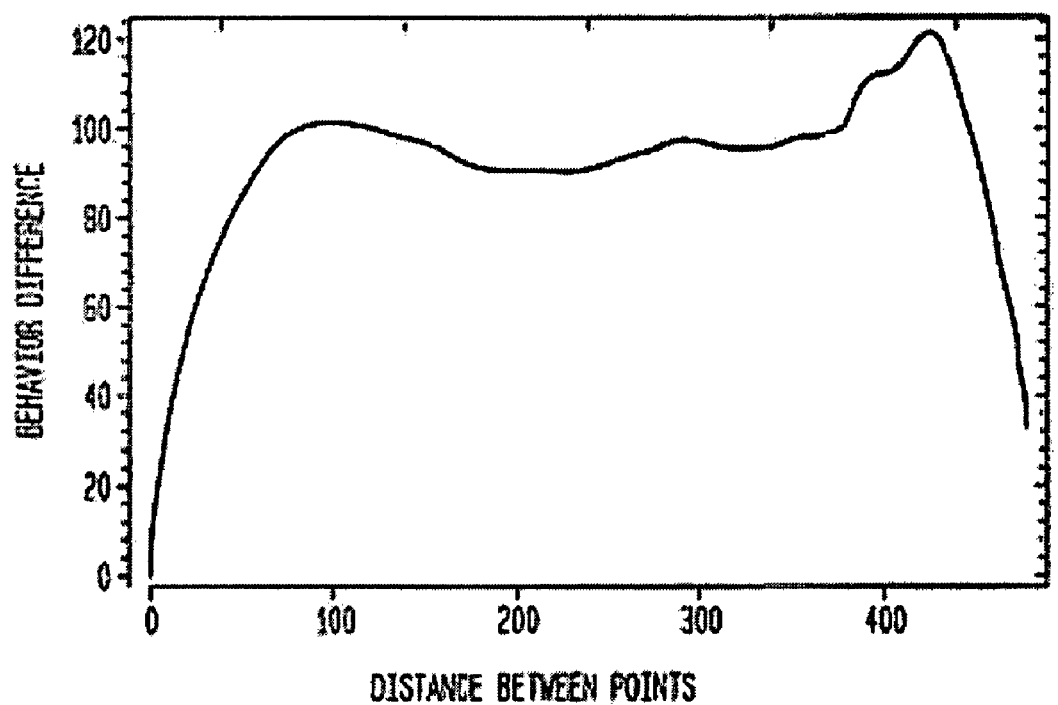
OFFICE- 384x288, RANGE=220

FIG. 7B
THE ab CURVE FORM 384x288 IMAGE
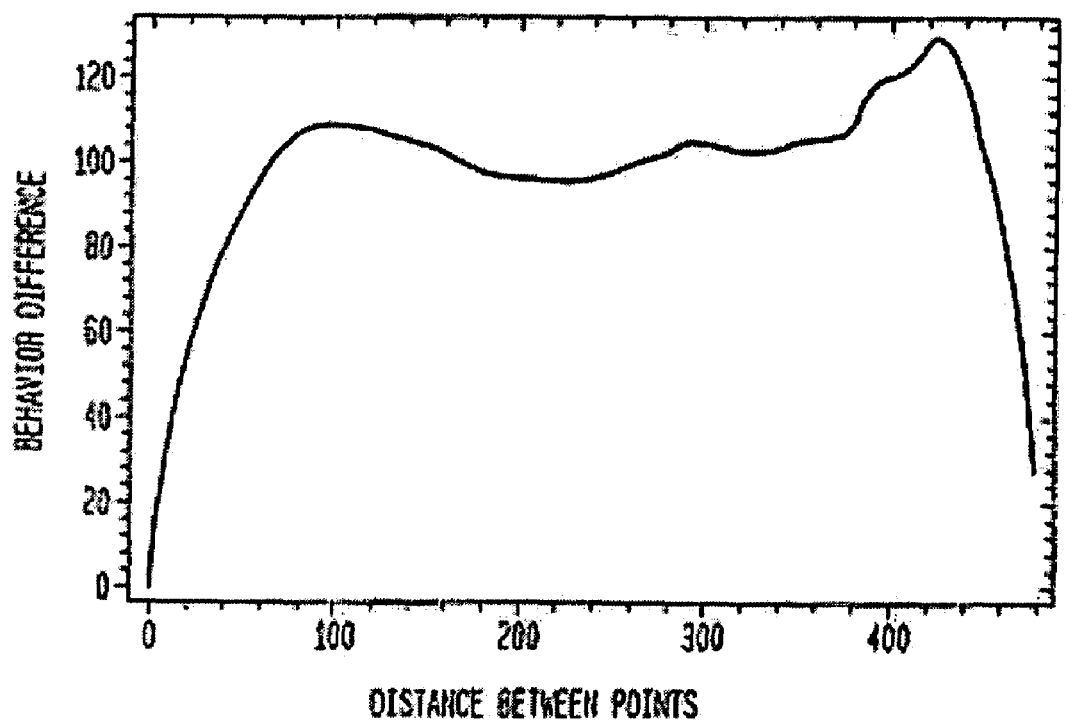
OFFICE 8 - 384x288, RANGE=8

FIG. 7C
THE ab CURVE FORM 384x288 IMAGE
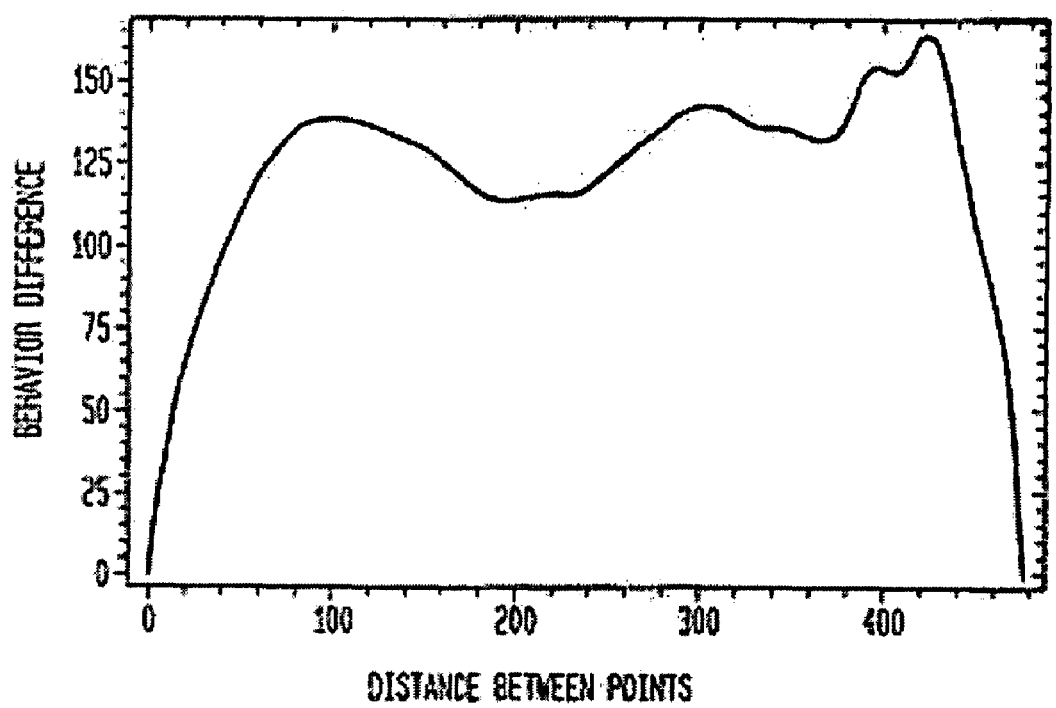
OFFICE 2- 384x288,RANGE=2

FIG. 8
THE ab CURVE FORM 384x288 IMAGE
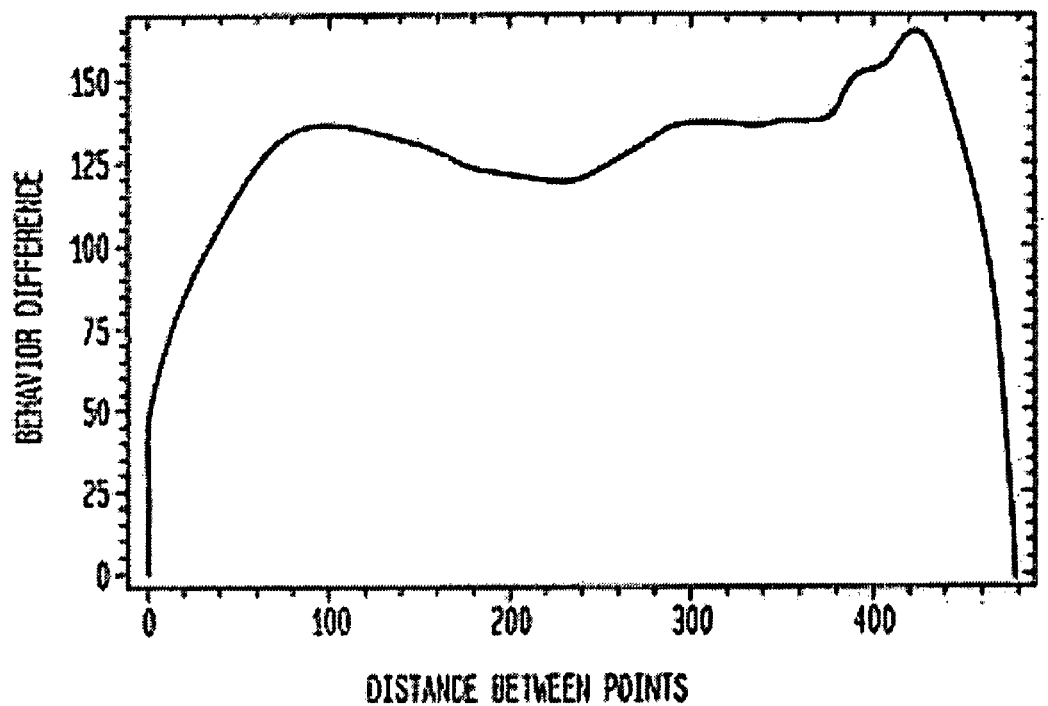
OFFICE DITHERED- 384x288.RANGE=2

FIG. 9
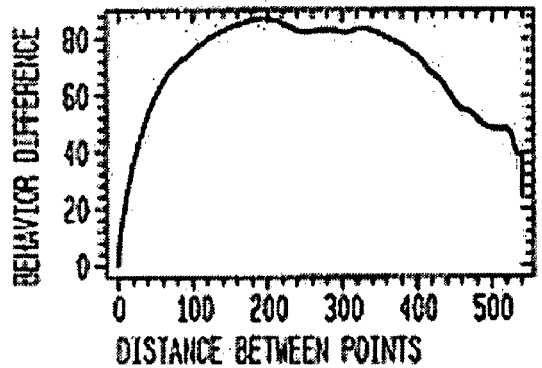
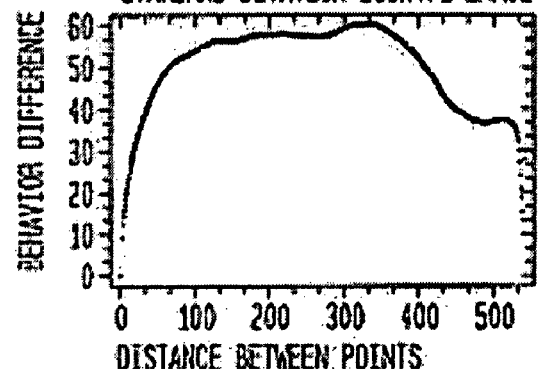
JESSICA- 268x472,RANGE=254

FIG. 10
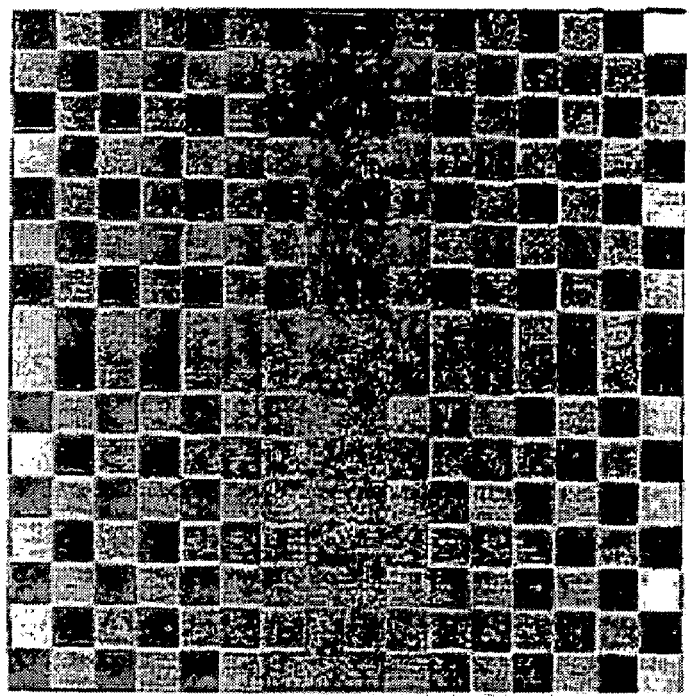
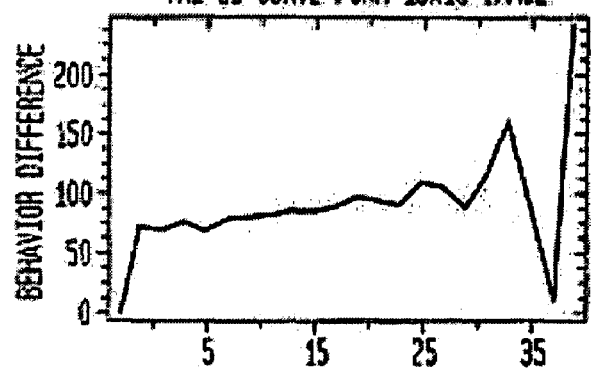
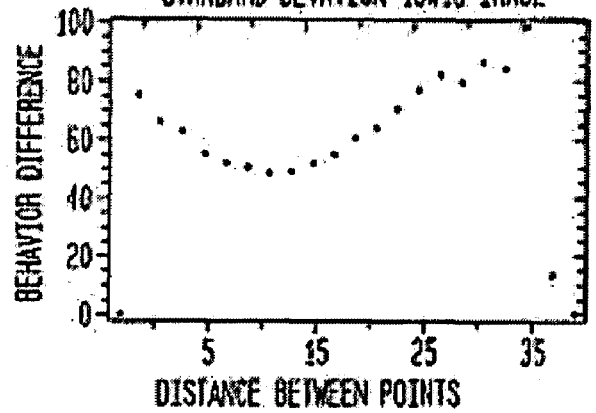
MAGIC SQUARE- 16x16, RANGE=256

FIG. 11A
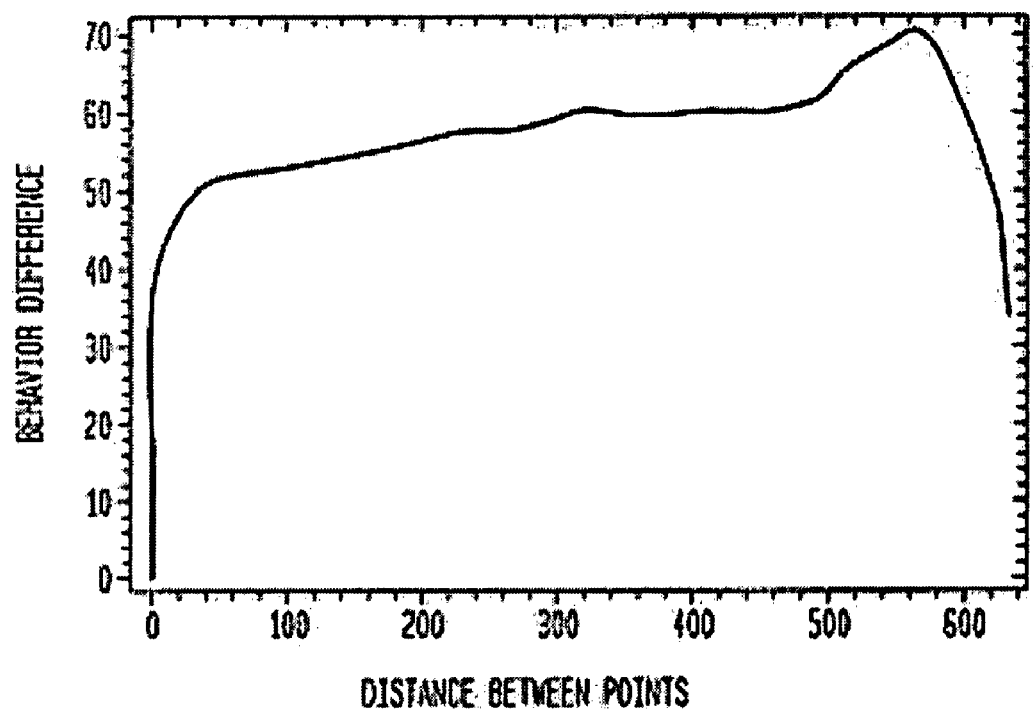
KOSCIOSKO- 512x384, RANGE=254

FIG. 11B
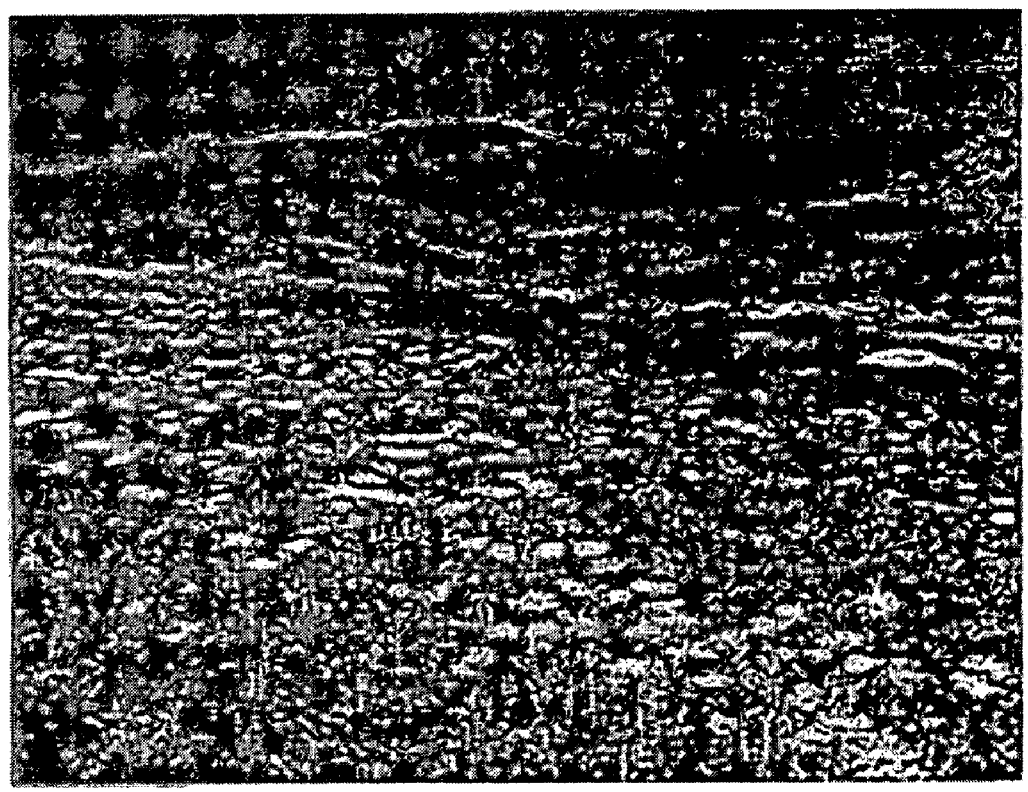
THE ab CURVE FORM 128x96 IMAGE
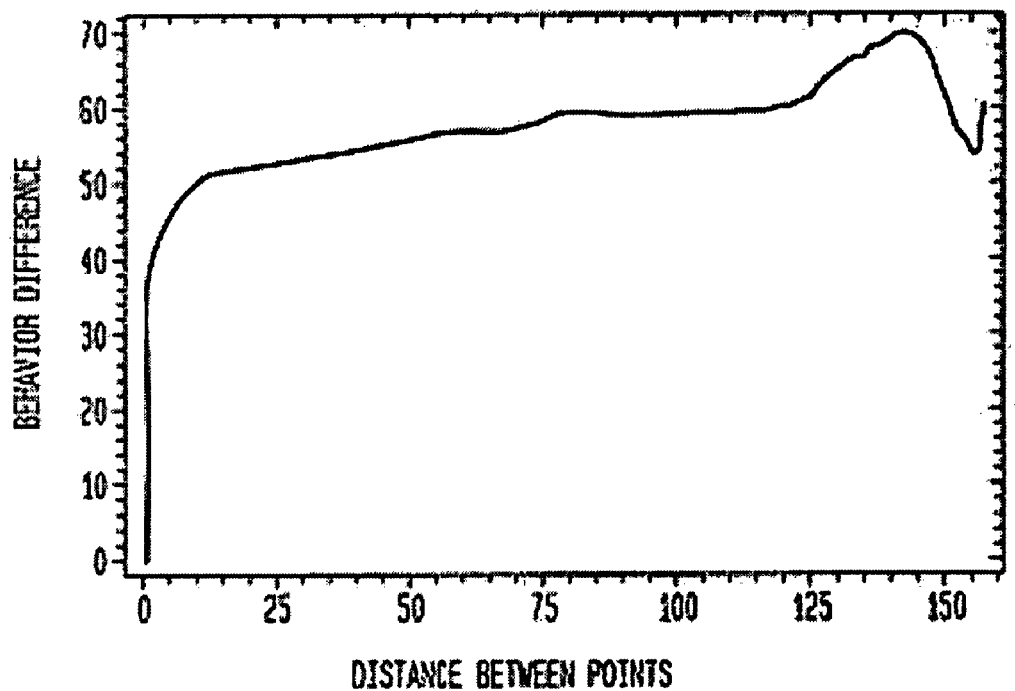
KOSCIOSKO SMALL - 128x96, RANGE=249

FIG. 12A
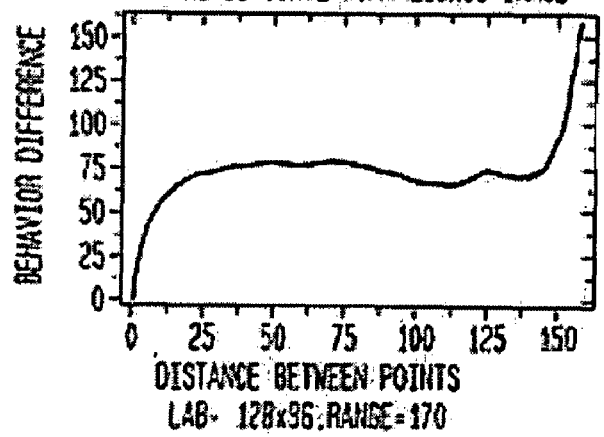
FIG. 12B
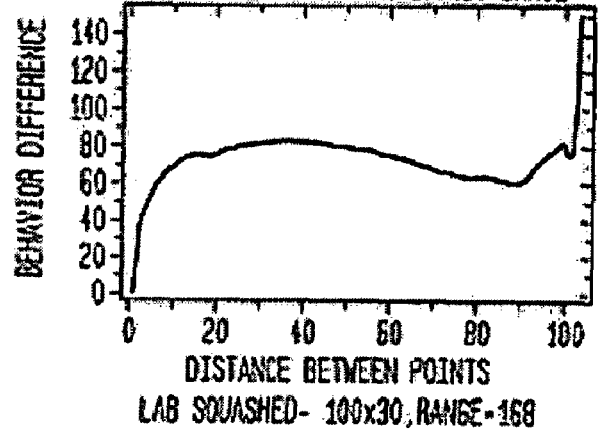

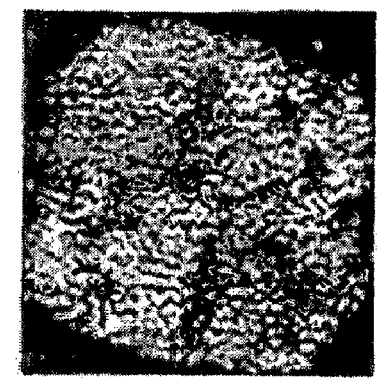
FIG. 14D   FIG. 14C   FIG. 14B   FIG. 14A
INPUT IMAGE SAMPLES
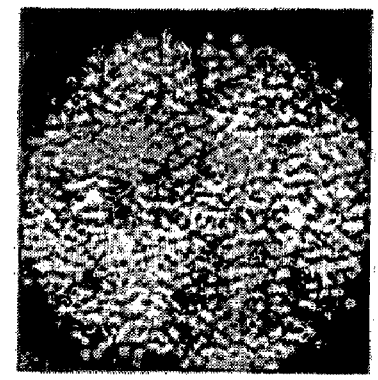
FIG. 14H
500,000,000
INCOHERENCE=0.038250
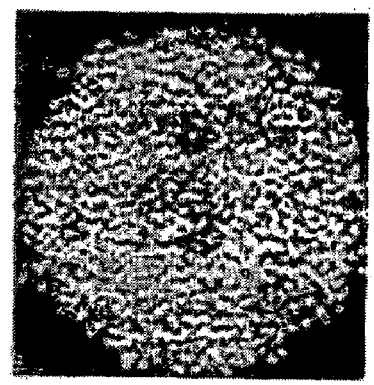
FIG. 14G
375,000,000
INCOHERENCE=0.179479
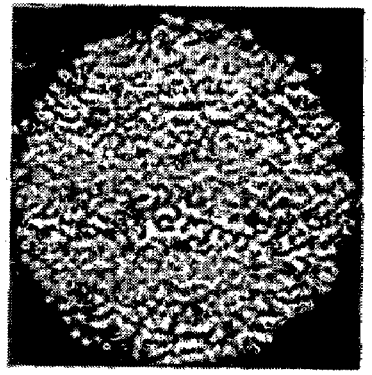
FIG. 14F
250,000,000
INCOHERENCE=0.511162
FIG. 14E
125,000,000
INCOHERENCE=0.618197
TEST IMAGE RECONSTRUCTIONS

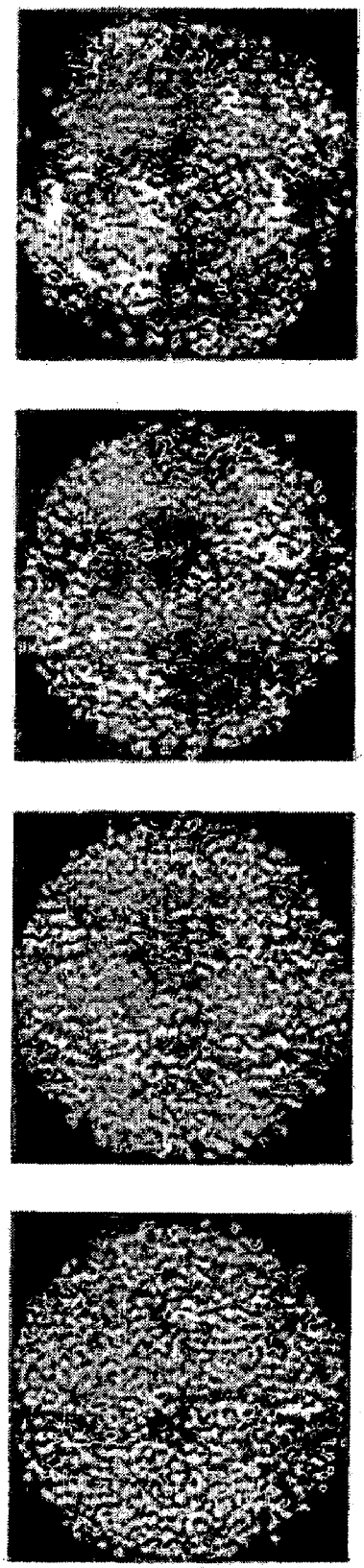

625,000,000
INCOHERENCE=0.011335

INPUT IMAGE SAMPLES

TEST IMAGE RECONSTRUCTIONS
125,000,000
INCOHERENCE=0.579658

250,000,000
INCOHERENCE=0.333468

375,000,000
INCOHERENCE=0.100109

500,000,000
INCOHERENCE=0.011095

PUSH A (+ START)

END A (+ FINISH)

APPARATUS AND METHOD FOR THE CONSTRUCTION OF SPATIAL REPRESENTATIONS

CROSS REFERENCE TO RELATED APPLICATION

This application claims the priority of Australian patent application Ser. No. PR 1129 filed on Oct. 30, 2000 and Australian patent application Ser. No. PR 6616 filed Jul. 27, 2001.

FIELD OF THE INVENTION

The present invention relates generally to an apparatus and method for the construction of spatial representations and, particularly, but not exclusively to an apparatus and method for the unsupervised construction of spatial representations of referents.

BACKGROUND OF THE INVENTION

The world is full of data, objects and actions, called referents, that have, or can usefully be interpreted as having, relative spatial locations. It is useful to be aware of these relative locations since this information is important to the correct operation of many systems.

A referent may be a sensor, such as an image sensor, audio sensor, pressure sensor, and generally any sensor which provides a signal. A referent may be a point in the world at which such a sensor is aimed. A referent may be any point that is related to an action. A referent may be a source of data.

The relative spatial location of a referent can be represented by a locator embedded in a n-dimensional spatial representation.

A referent maybe a source or filter of information, called a signal, such that this signal may be used to effect positioning of the associated locator in a spatial representation.

For example, image processing and machine vision systems generally utilise an array of light sensitive sensors (e.g. CCDs). In this case, the referents are sources in a perceived scene which activate individual light sensors. Locators are the pixels that attempt to represent the relative positions of these referents. The changing value of each pixel is the signal of its associated light sensor. In order to make intelligent interpretations of the signal from each individual light sensor, it is necessary for the system to be aware of the relative spatial positions of the light sensors. If the system is not aware of the relative spatial positions of the sensors, it may be unable to produce an organised image. Present systems are therefore given as a priori information all the relative spatial positions of the sensors, in notionally orthogonal matrices implicit in the standards established for handling photographic, video and other sense data. In the example of a CCD array, the de-multiplexed signals from the camera are arranged in a two-dimensional orthogonal matrix, each signal being assigned a unique position in a two dimensional space. These matrices are often arrays or lists of individual pixels. In order to read the signal of a sensor its position is given, in either coordinate or list position form, as an argument to an image function. This function then returns the value. The position is thus fixed and indexical. The sensor's signal is a secondary characteristic, in the traditional formulation.

The provision of a priori spatial information in image processing and other sensor systems is such an inherent requirement that it is almost taken for granted by most systems. Little thought has been given to whether it would be advantageous or possible to provide the spatial information in any other way apart from pre-programming the system.

There are, however, as the present applicants have realised, significant problems involved with the requirement to provide the system with a priori information on the spatial positions of the sensors. With systems, such as robots for example, which incorporate sensor sub-systems such as machine vision sub-systems, it is desirable that the system be able to operate as independently as possible. The problem is that the accuracy and consistency of a priori spatial information cannot be relied upon. For example, the relative spatial positions of the sensors may change so that the system becomes de-calibrated; spatial information about the sensor array may be only an approximation of the spatial arrangement of the referents that, due to, for example, lens distortions, is inaccurate in parts of the visual field; visual apparatus parts may be replaced with new parts of slightly different specifications; designs may be altered. Consequently, regular servicing and calibration is required to maintain reliability, but this is expensive and often difficult because the system may be remote, hard to access, or extremely small and delicate.

Even where a system is easy to access it is not desirable that regular servicing be required. The more independent the system, generally the less costly it is to operate.

Further, there are also situations where the a priori spatial information may not be available. Consider a large number of sensors randomly distributed across a space which is required to be imaged by the sensors—a number of sensors dropped onto the sea floor or another planet's surface, for example. Because the sensors are randomly positioned, a priori relative spatial information is not available.

These problems apply not just to vision sensors in image processing and machine vision systems, but to any referents where knowledge of spatial position is necessary for operation of a system.

The requirement of man-made sensor systems for such a priori information can be contrasted with biological systems which deal very well with physical space without the requirement for a priori information. Biological vision systems, for example, are able to build a picture of the physical space that they are viewing, without having to make any assumptions about the positional arrangement of the biological vision sensors (e.g. retinal cells).

Essentially, for independent operation of any system, it is preferable to avoid the dependence on a priori spatial information. Preferably, the system should be able to derive spatial information via its own sensor sub-system. There is therefore a need for an improved apparatus and method for estimating the relative spatial positions of referents.

Further, the present applicants have realised that it is not only sensor systems that usefully require spatial information. They have also appreciated that there are other referents which can be usefully represented by locators positioned in space. One significant example of referents which can be usefully represented in this way includes motor commands for moving systems which incorporate spatial sensor sub-systems. The present applicants propose the use of spatial representations for motor command referents in earlier filed provisional application number PR6616, filed on 27 Jul. 2001, and from which the present application claims priority.

Systems which include a motor sub-system are many and include robots used in industry (e.g. production line robots); robots used in remote areas (e.g. for exploration under sea or off-planet); vision systems used in commercial, research or military applications (e.g. to track moving objects, such as missiles, intruders, animal or human research subjects, contaminants in liquids, motor traffic); surveillance systems used for security purposes (e.g. unmanned cameras in pre-determined locations); low cost robots used for toys and other systems. Such systems usually have a motor sub-system which is arranged to cause motion of the sensor sub-system.

There are two absolute requirements for the satisfactory performance of a system incorporating a motor sub-system and sensor sub-system. The requirements are:
1. The sensor sub-system must include a plurality of sensors. As discussed above, in order for the system to build up a representation of the environment being sensed by the sensor sub-system, it must be given or able to infer the spatial positions of the sensors relative to each other.
2. The motor sub-system must include one or more motor commands each of which will affect motion of the sensor sub-system. In order for the system to properly control motion, it must be given or able to infer the effect of motor commands on the sensor sub-system. Without this, it cannot anticipate what any particular motor command will do, and therefore cannot select intelligently from the plurality of available motor commands.

The first requirement for sensor sub-systems has already been discussed above.

With regard to the second requirement (effect of motor commands on the sensor sub-system), in conventional systems, a priori knowledge of the effect of motor commands on the sensor sub-system or motion of system-controlled components is incorporated into the system. The system is therefore pre-programmed with knowledge of what a particular motor command will do.

For example, some machine vision systems include an array of sensors such that a visual field is divided into a portion of relatively low resolution at the periphery, and a portion of relatively high resolution at a central area known as the "fovea". The entire visual field can be used to rapidly detect visually interesting points that the system can then turn to look at for subsequent high resolution processing by using motor commands to place any point of interest at the fovea. Such machine vision systems are very useful, for example, for systems which require the capability to track moving objects such as missiles, intruders, animal or human research subjects, contaminants in liquids, and motor traffic.

In order to ensure that a machine vision system operates correctly, the motor sub-system (utilised to move the sensors so that an object of interest can be resolved in the high resolution area) must be correctly calibrated to the sensor sub-system. If the goal of the vision system is to concentrate its fovea on an object of interest, then given the location of the object relative to the fovea the system must correctly select a particular motor command, so that after that motor command is performed the object of interest is resolved in the fovea of the vision sub-system.

Presently, calibration is carried out with a priori knowledge of the effect of the motor commands on the motor sub-system and sensor sub-system. A problem arises, however, that the calibration may be incorrect, or more importantly, over time (considering wear and tear of mechanical parts) the system may decalibrate. Further, prior calibration to attempt to provide a system which will be reliable may be very expensive (e.g. in providing the best mechanical parts, fine tolerance parts, etc).

For the same reasons as were given in the case of sensor systems, regular maintenance, servicing, and recalibration of motor systems is undesirable.

There is a need for a system which includes a motor sub-system and a sensor sub-system, which enables automatic continuous calibration of the motor sub-system to the sensor sub-system.

SUMMARY OF THE INVENTION

In accordance with a first aspect of the present invention there is provided a method of producing a geometrical representation of a plurality of referents in space, comprising the steps of obtaining signals from a plurality of referents and utilising the signals in order to provide the geometrical representation of the referents.

Preferably, the signals provided by the referents are used to derive the geometrical representation of the referents. The position of the referents is not directly provided by the signals. Preferably, the step of obtaining the signals includes the step of obtaining signals from sensors associated with the referents.

In one embodiment, the referents are the sensors themselves. For example, the sensors may be pressure sensors, which need to be represented relative to each other so that images can be built up from their signals. With the present invention, this geometrical representation is built up purely from the signals provided by the sensors themselves, and there is preferably no requirement for any a priori spatial information to be provided.

In another embodiment, the referents are not the sensors but are sources which are associated with the sensors and for which a geometric representation is useful or necessary. For example, the sensors may be remote sensing devices aimed at points (sources) in the environment, in which case their signals refer to values obtaining at those points, rather than at the location of the sensors themselves.

In another embodiment, the referents are not sensors but are referents which are associated with actions for which a geometrical representation is useful or necessary. For example, the referents may be motor commands for a motor sub-system within a system including a motor sub-system and a sensor sub-system. To provide a geometrical representation of the motor commands as locators is useful, as discussed above, in enabling calibration of the motor sub-system to the vision sub-system.

In another embodiment, the referents are not sensors but are referents which provide a flow of information. For example, in one embodiment the referents may be databases or data structures that are updated by other systems. The constantly updated values are considered the signals of such a system. The method of the present invention is preferably a self-organisation process. That is, if the method is applied within a system, such as an image processing system, for example, no further information other than the signals is required by the system. The system is therefore, effectively independent of any a priori spatial information. It is able to operate independently in the same way as biological systems are able to operate independently. It will be appreciated that this will give rise to significant advantages.

In the embodiment where the referents are the sensors themselves, the method preferably includes the steps of collecting signals from the plurality of the sensors and analysing the signals in order to provide a geometrical representation of the sensors.

Preferably, the signal differences (which in this document are also termed "behavioural differences") between the signals from any two referents is assumed to imply a distance between the referents. This follows from a general relationship that exists between space and behaviour. This relationship presents itself as "spatial redundancy". Generally, spatial redundancy dictates that the more different the signal behaviour of the pair of like referents, the greater the probable distance between them, and vice versa. This relationship has previously been considered problematic, but the present applicants have appreciated that this relationship may be utilised in order to facilitate a self-organisation process for providing geometrical representations of many kinds of referent based on the behaviour of their signals. Preferably, signals from a plurality of sensors (or any other referents) are treated as a self-organising set whose proximity to each other in a geometrical space is determined by the similarity of their respective behaviours.

Preferably, it is also assumed that the signals are temporally alignable so that meaningful comparisons of their behaviour may be made.

As discussed above, spatial redundancy may present itself as a relationship between 1) the distance between two referents, and 2) the difference in behaviour of the signals (i.e. difference in signal value) of those two referents. This relationship may be used to obtain an approximation of the actual distance, "a", between two referents based on the behavioural difference, "b", between the signals. Once an approximation has been determined for "a", the problem remains to find an arrangement for the locators in the geometrical representation which accurately reflects the value, "a", for each pair of referents. When a set of locators is given relative geometrical positions, there will be a calculable geometrical distance, "g", between each pair of locators. It is clearly advantageous to find a geometrical arrangement of the locators such that "a", is proportional to "g" for each possible pair. For the purposes of this specification, the term "actual distance", "a", is used to refer to the physical distance between the referents. The term "geometrical distance", "g", refers to the distance between the locators in their geometrical spatial representation and the term "behavioural difference", "b", refers to the difference between signals. Behavioural difference can refer to the difference between instantaneous, simultaneous signal values or some function of these values, over time.

Preferably, the step of utilising the signals comprises the further step of determining an error function that captures the difference between the actual distance between the referents, and minimising this error function. With no prior knowledge of the actual position of the referents, the initial locator geometry may be considered to be randomly distributed. In this embodiment, the method proceeds by making changes to the geometrical representation to reduce the error, "$\epsilon$", such that the geometrical representation corresponds to the referents' actual positions.

In one form, the method of the present invention may include the following steps:
1. Make a change to the geometrical representation with the aim of reducing "$\epsilon$".
2. Go to step 1.

If considering the effect on "$\epsilon$" of only one locator, "i", the method of the present invention may include the following steps:
1. Select a locator, "i".
2. Make a change to the position of "i" in the geometrical representation with the aim of reducing "$\epsilon$".
3. Go to step 1.

Preferably, when considering the effect of a locator "i", in relation to another locator, "j", the method includes a stochastic, pair-based approach and includes the following steps:
1. Select a pair of locators, "i" and "j".
2. For each dimension, "x", in the geometry,
 2.1 Compute $h_{[x]i,j} = k(x_j - x_i)(1 - a_{i,j}/g_{i,j})$;
 2.2 Set $x_i$ to $x_i + h_{[x]i,j}$;
 2.3 Set $x_j$ to $x_j - h_{[x]i,j}$;
3. Go to step 1.

Whilst the method of the present invention is applicable to any number of dimensions, in the preferred embodiment as applied to the field of machine vision, the number of dimensions of the geometry of sensors is often limited to two.

Behavioural difference, b, can be obtained using several sub-methods. Preferably, b equals the absolute value of instantaneous signal differences, or the accumulated average of the absolute value of instantaneous signal differences, or 1−r where r is the correlation between the instantaneous values of the signal.

Preferably, a statistic, "$\mu$", is established which measures the expected behavioural difference between signals from a pair of referents where the signals are independent of each other. In the case of b being derived from signals differences, the value of "$\mu$" may be determined from the relationship:

$$\mu = \int_{-\infty}^{\infty} \int_{-\infty}^{\infty} p_i(x) p_j(y) |x - y| \, dx \, dy$$

where $p_i$ is the probability density function of sensor i values. In the embodiments where b is derived from correlation $\mu$ may be set to 1.

If signals from sensors have some correlation, then the actual measure of behavioural difference, "b", will tend to be less than "$\mu$". Preferably, any "b" values which are obtained which are greater than "$\mu$" can therefore be ignored in implementing the method of the present invention. This advantageously avoids needless processing. Similarly, in some circumstances "b" value is close to the value of "$\mu$" or the same as the value of "$\mu$" can also be ignored.

Preferably, the method of the present invention includes various sub-methods that may be implemented to determine a geometrical arrangement of the locators in order to balance between the effects of the available computational power, the complexity of the sensor system and its environment.

In a particularly preferred embodiment, the geometrical arrangement of the locators is achieved by first considering a subset of all available locators, and gradually including additional locators subsequently during processing of signals. In addition, a sample of the entire population of locator pairs may be used for the computation of statistics.

For the purposes of the specification, the set of statistics associated with a pair of signals is referred to as one "unit in the workforce". A workforce that has one unit for each pair of signals is referred to as a "complete workforce". Given that the generation of statistics consumes computational resources, techniques utilising a workforce consisting of a sample of the possible pairs are sometimes preferred. A preferred technique involves a sub-method for "evolving" the workforce which includes the following steps:
1. Select a workforce unit, "u", (for locators "i" and "j");
2. Adjust the locations of "i" and "j";
3. With probability, "p", reassign "u" to a new pair of locators;
4. Go to step 1.

The method of the present invention may use various sub-methods for the adjustment of the positions of locators "i" and "j".

The probability, "p", and the method for reassigning a workforce unit "u" may be varied. The preferred approach when evolving the workforce is to prefer pairs which have smaller values for "b". Adopting this approach, the preferred embodiment expression for "p" is:

$$p = 1 - \frac{1}{1 + k_{break}\frac{b}{\mu'}}$$

Once it has been decided that a unit is to be redeployed there remains the issue of how to reassign it to other locators. In a preferred embodiment of the invention, the value "$b_{i,j}$" is considered to be the average difference in signals for "i" and "j". As a result of comparing "$b_{i,j}$" to the expected difference "$\mu$", "$a_{i,j}$" may be inferred. In this respect, surprisingly good results can be obtained using only instantaneous values for "b" compared to values accumulated over time. In the preferred embodiment, the initial value for "b" ($b_o$) is set to:

$$b_o = \mu'(1-e^{-g})$$

In one embodiment, an approximation for "$\mu_{i,j}$" is used, the approximation being expressed as follows:

$$\mu_{i,j} = \sqrt{\frac{2}{\pi}} e^{-\frac{1}{2}\left(\frac{v_{i,j}}{s_{i,j}}\right)^2} s_{i,j} + Erf\left(\frac{1}{\sqrt{2}} \frac{v_{i,j}}{s_{i,j}}\right) v_{i,j}$$

where Erf(x) is defined as the integral of the Gaussian distribution, $$Erf(x) = \frac{2}{\sqrt{\pi}} \int_0^x e^{-t^2} dt$$

The method of the present invention may make use of various sub-methods for the determination of "$\mu$'", the precise choice most likely depending upon the choice of sub-method for determining b, the levels of prior knowledge of the environment, the available computational power and the required accuracy of the result. In formulating a sub-method for the determination of "$\mu$'", a softness factor may be included such that as the value of "b" increases, the extent to which locators are moved is reduced. A preferred softness factor may be expressed as follows:

$$\frac{1}{1 + k_{soft}\frac{b}{\mu'}}$$

and may be incorporated into the gradient descent algorithm in the preferred embodiment such that the sub-method includes the following steps:
1. Select a pair of locators, "i" and "j";
2. Ascertain "b", "$\mu$'" and "g" for the pair;
3. Use "b" and "$\mu$'" to derive "a'"
4. Compute factor=$k(1-a'/g)(1/(1+k_{soft}b/\mu'))$
5. For each dimension, "x", in the geometry,
   5.1 Compute h=$(x_j-x_i)$ factor
   5.2 Set $x_i$ to $x_i+h$
   5.3 Set $x_j$ to $x_j-h$
6. Go to step 1.

The present invention can be applied for any type of referent and not just vision sensors. It may be used with pressure sensors, audio sensors and any other type of sensors.

As discussed above, the present invention is not limited to providing spatial representations of the relative positions of sensors, but can also be used for other referents, such as motor commands for a motor sub-system.

The present invention can also be applied to referents which are sources of data, possibly in non-physical domains.

In a further embodiment, therefore, the referents are not sensors but are separate items which are associated with the sensors.

In one embodiment, the referents are motor commands for a motor sub-system. Preferably, the motor sub-system is associated with a system which also includes a sensor sub-system. The method of this embodiment of the present invention is preferably arranged to provide a geometrical representation of the effect of the motor commands. Preferably the method includes the step of representing the effect of a motor command in a geometrical representation of sensory information provided by the sensor sub-system.

Note that a "sensor sub-system" refers to the component or components that provide the sensor signal or signals. The term "motor sub-system" refers to the component that performs the motor command. Preferably, there are a plurality of sensors within the sensor sub-system providing a plurality of sensor signals. Preferably, there are a plurality of motor commands available to the motor sub-system. Preferably, the method of the present invention is arranged to calibrate the plurality of motor commands by representing the effect of a motor command via a locator in a geometrical representation of sensory information provided by the sensor sub-system.

As will be appreciated, where there is a plurality of sensors in the sensor sub-system, which provide a plurality of signals, there may be a geometrical arrangement of locators which represent referents associated with those sensors. Preferably, each locator associated with a sensor referent is assigned a position in a geometrical representation such that locators which are near to each other in the representation are associated with referents which are actually near to each other. In the example of a CCD array, the de-multiplexed signals from the camera are arranged in a two-dimensional orthogonal matrix, each signal being assigned a unique position in a two dimensional space.

The applicants have realised that the task of calibrating the motor sub-system to the sensor sub-system can be simplified by representing the effect of a motor command via a locator in a geometrical representation of sensory information provided by the sensor sub-system.

There is now a frame of reference to determine the effect of the particular motor command on sensory information. The effect of a particular motor command, that is, the direction and distance of movement of information within the sensory space that results from it, is directly related to the position of its locator within the geometrical representation.

Preferably, the step of positioning the locator of the motor command includes the step of collecting signals from a plurality of sensors in the sensor sub-system before and after a performance of the motor command and analysing the signals in order to obtain information regarding the spatial relationship between the motor command performed and the spatial arrangement of the plurality of sensors.

Preferably, the step of analysing the signals comprises the step of comparing the signal of sensor locator "i" taken before a motor command is performed, to the signal of a selected reference sensor locator "j" taken after the motor command has been performed. The behavioural difference of the two signals is utilised to adjust the position of the motor command locator relative to the locator "i". The positioning of the motor command locator is preferably carried out by utilising the method discussed above for providing a geometrical representation of a plurality of referents.

In order for adequate calibration to occur, this step of analysis depends on the environment remaining relatively stable during the time of performance of the motor command. Then it may be assumed that the main cause of change in the signals is the performance of the motor command itself.

This method can be applied for a plurality of motor commands, to represent the effect of each motor command via a locator in a geometrical representation of sensory information provided by the sensor sub-system.

In this way, the plurality of motor commands is correctly mapped to the geometrical representation of the sensory information.

Where there are many sensors, the task of identifying the first sensor or sensors having a value before the performance of the motor command which is similar to the value of the second sensor or sensors after the motor command, becomes difficult. It may be necessary to process large amounts of data (a CCD array may have many thousands of pixels and there may be many motor commands to deal with). In order to address this problem, present applicants have proposed two alternative methods of processing the sensor information.

Preferably, in the first method, the plurality of regions in the geometrical representation are allocated a probability that the particular motor command is positioned therein. The motor command is given the position of the part of the highest probability. The probability is preferably adjusted in an ongoing fashion, preferably for each performance of the motor command. The processing may be reduced, as it may be necessary to only look at high probability regions for a particular motor command.

In an alternative method preferably, the position of the motor command locator is adjusted relative to a plurality of sensor locators. The adjustments are determined by utilising the signals of the sensor locators.

To summarise, the effect of the motor command on the movement of the sensor sub-system (as perceived by the change in the signals) can be determined. This can be done for each of the motor commands to build up a geometrical representation of the effect of the motor commands in a geometrical representation of sensory information provided by the sensor sub-system. If this is done on an ongoing basis, the system will detect what each motor command does in respect of the geometrical representation of sensory information and will therefore be calibrated.

Preferably, the method of the present invention may operate continuously and without the intervention of outside parties such as an engineer. In this manner, the system can compensate for ongoing de-calibration phenomena such as wear and tear of mechanical components and even the replacement of components with other components using different scales of sensing or motor action. With the method of the present invention, because the system is preferably self-calibrating, the need for expensive initial calibration and expensive mechanical parts is mitigated. It is quite possible, therefore, that a sensor sub-system and motor sub-system utilising the present invention could be used for calibrating inexpensive systems such as, for example, toy robots.

As discussed above, in order to facilitate unsupervised organisation of the motor command locators, preferably "temporal redundancy" is required (the environment must stay relatively stable during the performance of the motor command). It is acknowledged by those skilled in the art that there is a multitude of objects in any view of the world, which for the most part remain where they are (at least over the time periods where calibration of the motor sub-system is taking place). This lack of relative change is "temporal redundancy". If the system performs a motor command which results in a change in the sensor sub-system's view of the world, and the duration of the motor command is short with respect to the temporal redundancy, then the "before" and "after" views of the world from the sensor sub-system will be highly correlated when corrected for the change of view. This enables the geometrical representation of the motor commands to be built up reliably from the changes in the sensor signals. It effectively enables the system to consider that changes in the sensor signals are due to the action of the motor command.

Where the duration of the performance of the motor command is not considered short with respect to the temporal redundancy, in order to implement the present invention, then, preferably, the motor command may be broken down into a sequence of shorter sub-commands (e.g. using a time threshold, or detectable change in behaviour). The method of the present invention can then be implemented in relation to each of the sub-commands in order to build up a geometrical representation via locators for each of the motor sub-commands.

Preferably, the geometrical arrangement of the locators is established in an ongoing fashion utilising the method of the present invention to determine the position of the locators based on signal behaviours.

BRIEF DESCRIPTION OF THE DRAWINGS

Features and advantages of the present invention will become apparent from the following description of the embodiments thereof, by way of example only, with reference to the accompanying drawings, in which:

FIGS. 5a, 5b, 5c and 5d are a representation as to how changing image contrast affects $\mu$ in the ab relationship;

FIGS. 6a, 6b, 6c and 6d are a representation as to how blurring an image decreases $\lambda$ and has a smoothing effect in the ab relationship;

FIGS. 7a, 7b and 7c are a representation of the effect of reduction in resolution of sensor scale;

FIG. 8 is a representation illustrating the effect of dithering with respect to the image of FIG. 7c;

FIG. 9 is a representation illustrating the effect of long smooth gradients in an image producing a smooth gradient in the ab relationship;

FIG. 10 is a representation illustrating a standard deviation in an image of constant local average;

FIGS. 11a and 11b are a representation illustrating the resultant lack of an effect from a change of resolution;

FIGS. 12a and 12b are a representation illustrating the effect of disproportionate scaling on the ab relationship;

FIGS. 14a and 14h are a series of representations of images of uncontained rectangles and the appearance of test images having been passed through developing geometries;

FIGS. 15a to 15h are a series of representations of images of activation waves (width=50) and the appearance of test images having been passed through developing geometries;

DESCRIPTION OF PREFERRED EMBODIMENTS

Preferred embodiments of the invention will now be described with reference to the drawings.

In a first embodiment, application of the method of the present invention to utilise signals from sensors associated with referents in order to implement a geometrical representation of the referents, constituted by locators, will be described, in particular in relation to a machine vision application. It will be appreciated that application are not limited to machine vision.

Figure 18:
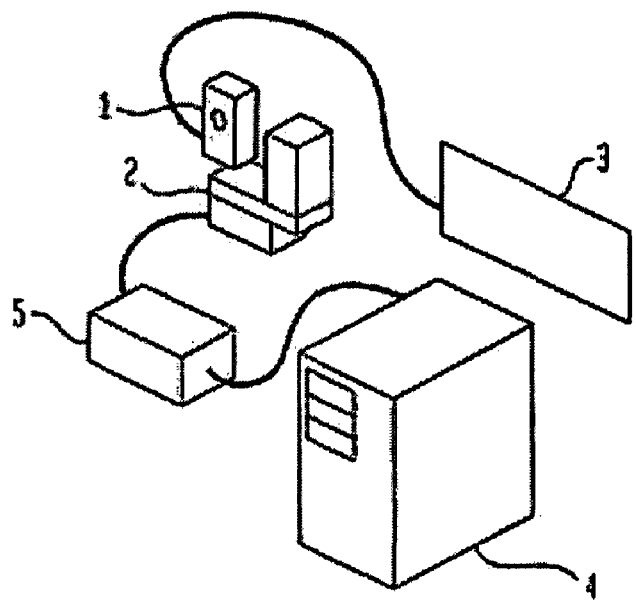
FIG. 18 is a schematic diagram of a system incorporating an apparatus for implementing a method of calibration of motor commands in accordance with a further embodiment of the present invention.
Figure 19:
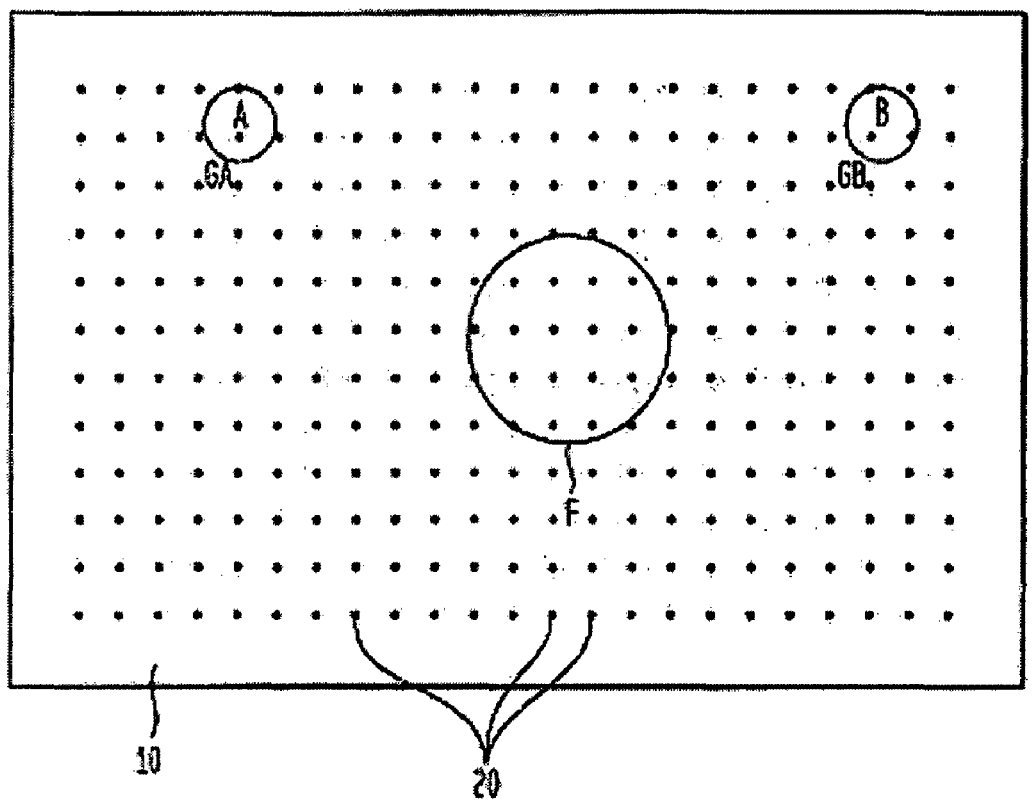
FIG. 19 is a schematic representation of a sensor space to illustrate the positioning of motor commands within the sensor space.
Figure 20A:
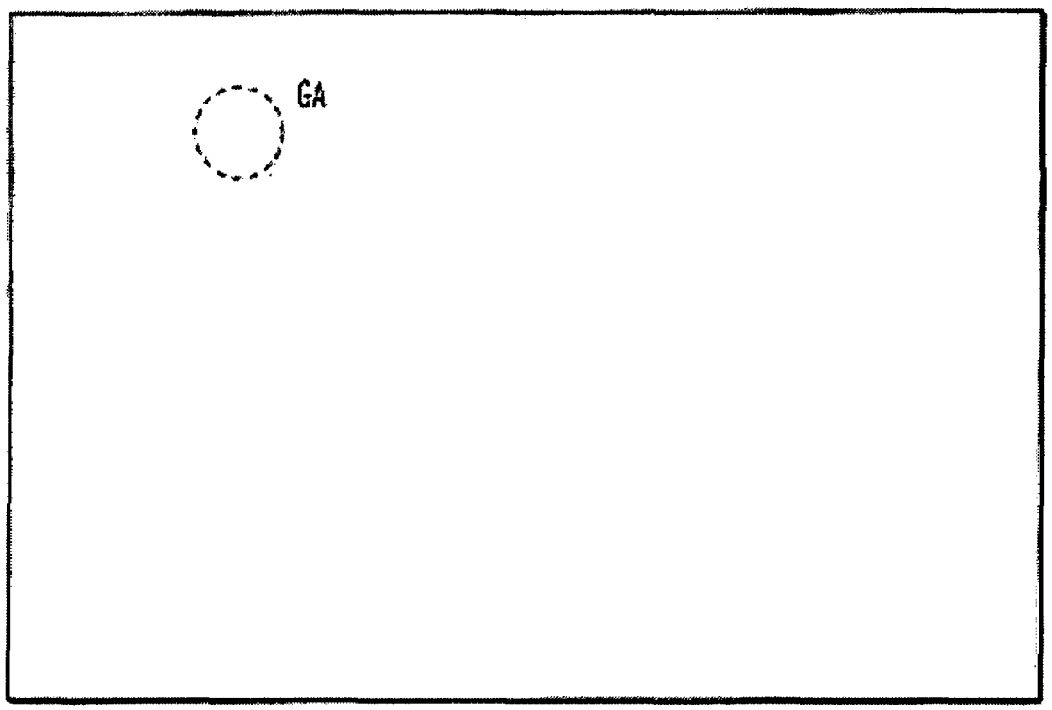
FIGS. 20a and 20b are further schematic representations of the sensor space illustrating steps in the method in accordance with an embodiment of the present invention.
Figure 20B:
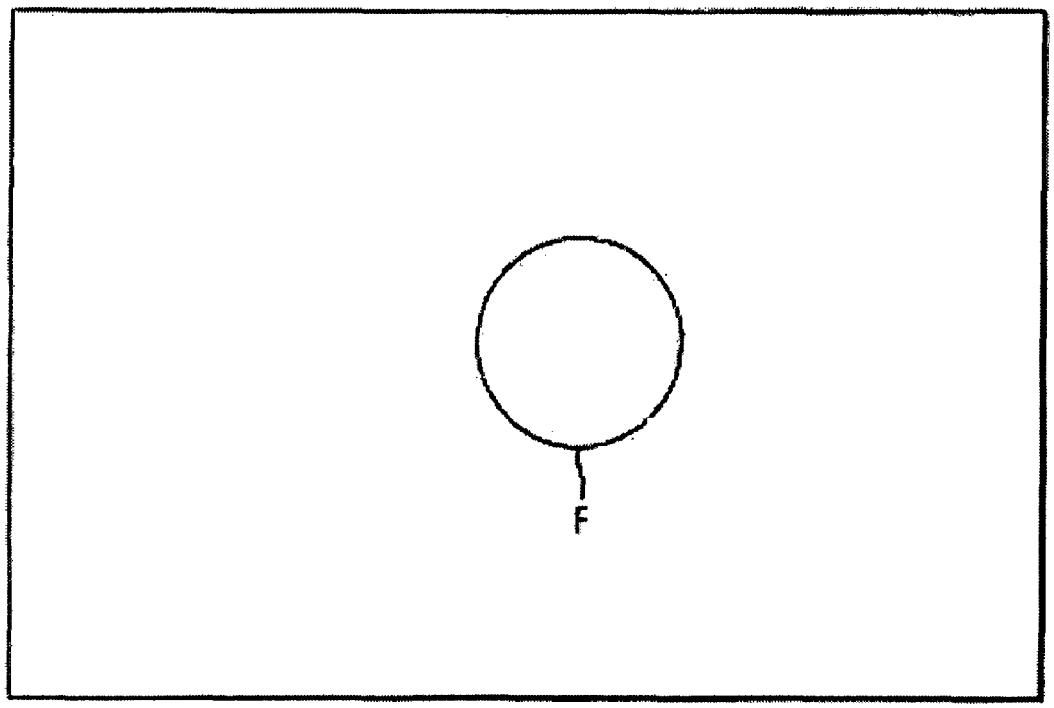

A further embodiment will then be described referring to FIGS. 18 through 20, the further embodiment relating to an application of the invention where a motor sub-system is calibrated to a machine vision sensor sub-system by providing a geometrical representation of the motor commands in accordance with the method of the present invention.

BEST MODES OF THE INVENTION

An embodiment of the present invention is readily applicable to machine vision and image processing tasks. It will be appreciated that in machine vision the referents are points in a scene which are the sources of the signals for the sensors.

Figure 22:
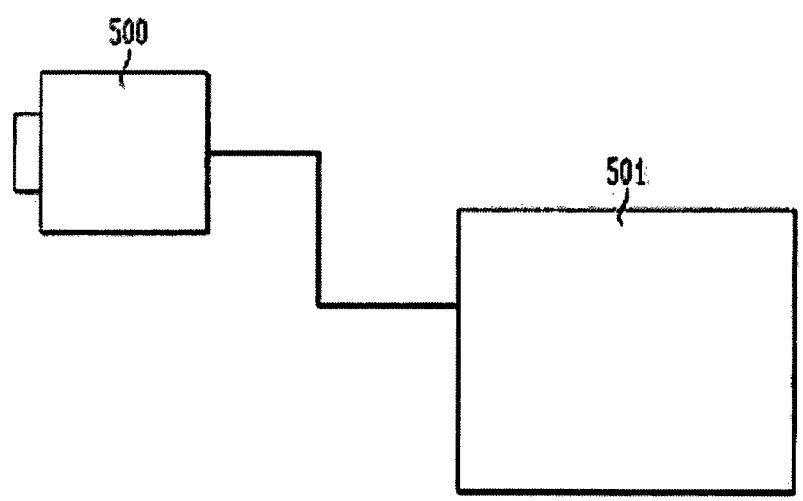
FIG. 22 is a block diagram of a machine vision system in accordance with an embodiment of the present invention.

FIG. 22 is a schematic block diagram of a machine vision system in accordance with an embodiment of the present invention. The machine vision system comprises a CCD camera 500 and a computing apparatus 501 which is arranged to implement, by way of appropriate software and hardware, the algorithms which will be described subsequently herein, in order to provide a geometrical representation of signals received from the CCD array.

Figure 1C:
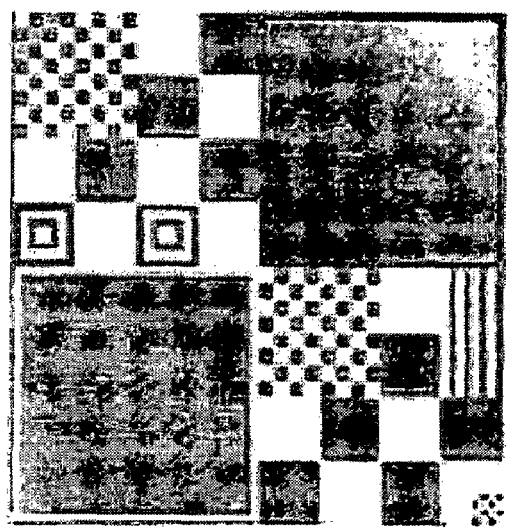
FIGS. 1a, 1b and 1c are a representation of an initial geometry, a geometry processed by an embodiment of the present invention, and the original image respectively.
Figure 1B:
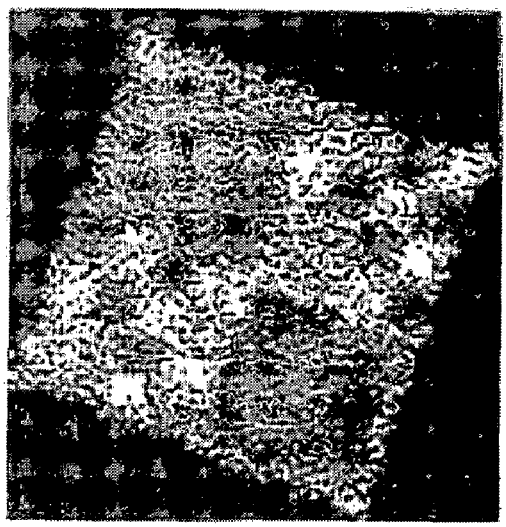
Figure 1A:
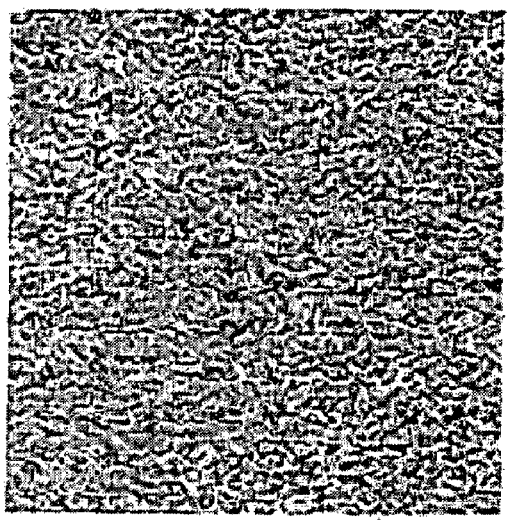

FIG. 1c illustrates a test image input to the CCD array 500 of the present invention. FIG. 1b shows the output from the system of the present invention before processing has progressed and FIG. 1b shows the output after the geometrical representation has been arranged after processing has progressed in accordance with this embodiment of the present invention.

In a preferred embodiment, the analysis of data collected by sensors is effected by a method that attempts to minimise an error function that captures the difference between the actual distances between the referents and the geometrical distances between the corresponding locators. It proceeds by making changes to the geometric representation in an attempt to reduce any error, such that the geometrical representation corresponds to the referents' actual positions.

For a pair of referents where locators are, i and j, it is understood that the method does not have direct knowledge of the actual distance between the referents, referred to as $a_{i,j}$. However, for this particular embodiment, it is assumed that the behavioural difference, referred to as $b_{i,j}$ is functionally dependent upon the actual distance between the referents. A formal expression of the assumptions of the method may be stated as:

$$b_{i,j} = f(a_{i,j}) \tag{1}$$

where f is an invertible function.

As $b_{i,j}$ may be determined from the signals themselves, $a_{i,j}$ is inferred using, $$a_{i,j} = f^{-1}(b_{i,j}) \tag{2}$$

The geometrical distance between two locators is the distance metric in the interpreted geometrical representation. For example, for locators in a two dimensional geometrical representation:

$$g_{i,j} = \sqrt{(x_i - x_j)^2 + (y_i - y_j)^2} \tag{3}$$

We may define an error function, aid which captures the error in geometrical distance with respect to actual distance. This may be expressed as:

$$\epsilon_{i,j} = (g_{i,j} - a_{i,j}) \tag{4}$$

For a locator, i, the accumulated error in position is the sum of component errors, namely:

$$\varepsilon_i = \sum_{i \neq j} \varepsilon_{i,j} \tag{5}$$

And the total error for the system is the sum of the individual locator errors:

$$\varepsilon_i = \sum_i \varepsilon_i \tag{6}$$

$$= \sum_i \sum_{i \neq j} \varepsilon_{i,j}$$

The method of the preferred embodiment attempts to establish a geometrical representation of referents that minimises $\epsilon$. Expressed in terms of a hill climbing algorithm, the problem is one of determining some small change to the geometrical representation which aims to reduce $\epsilon$. The top-level method may be expressed as:

1) Make a small change to the geometrical representation with the aim of reducing $\epsilon$
2) Go to 1.

This may be clarified by considering the effect of moving only one locator. It can be shown that if changing the position of a single locator, z, reduces $\epsilon_z$, then the total error, $\epsilon$ is reduced proportionally. As $\epsilon$ is the sum of individual $68_{i,j}$ then moving z can only affect those components of $\epsilon$ where i=z and j=z. We can partition $\epsilon$ into the three components, namely, $\sum_{i \neq z} \epsilon_{i,z} \sum_{j \neq z} \epsilon_{z,j}$ and $\sum_{i \neq z, j \neq z, i \neq j} \epsilon_{i,j}$. Moving z only affects the first two components. As $\epsilon_{i,j}=\epsilon_{j,i}$, it can be seen that $\Sigma_{i\neq z}\epsilon_{i,z}=\Sigma_{j\neq z}\epsilon_{z,j}$, which, from equation (5) equals $\epsilon_z$. So the total error, $\epsilon$, is changed in proportion to the change in $\epsilon_z$.

Changing the position of locator i, to reduce $\epsilon_i$, will reduce $\epsilon$, so the method may be expressed as:
1) Select a locator, i.
2) Make a small change to the position of the locator with the aim of reducing $\epsilon_i$.
3) Go to 1.

A particularly useful hill-climbing algorithm is the type referred to as "gradient descent". To move the locator using a gradient descent approach, it is moved in the direction, $-d\epsilon_i/dX_i$, where $X_i$, is a vector describing the geometrical position representing i. In other words, the locator is repositioned in the direction that will locally reduce the error.

The gradient descent may be reduced into components. Considering just the x component, if the change in geometrical representation of the locator, i, is $h_{[x]i}$, then:

$$h_{(x)i} = -k \frac{d\varepsilon_i}{dx_i} \quad (7)$$

where k is some small, positive constant.

From the definition of $\epsilon_i$, $h_{[x]i}$ may be expressed as follows $$h_{(x)i} = -k \sum_{j \neq i} \frac{d\varepsilon_{i,j}}{dx_i} \quad (8)$$

$$= -k \sum_{j \neq i} \frac{d(g_{i,j} - a_{i,j})^2}{dx_i}$$

$$= -2k \sum_{j \neq i} \frac{(g_{i,j} - a_{i,j})(x_i - x_j)}{g_{i,j}}$$

As k is some arbitrary positive constant, the expression may be simplified to:

$$h_{(x)i} = \sum_{j \neq i} h_{(x)i,j} \text{ where} \quad (9)$$

$$h_{(x)i} = k(x_j - x_i)\left(1 - \frac{a_{i,j}}{g_{i,j}}\right) \quad (10)$$

Equation (10) indicates that for each locator, j, we should move locator i towards j, in proportion to its geometrical distance from j (by considering, $x_j-x_i$), but this is scaled by $1-a_{i,j}/g_{i,j}$, which is negative when i and j are too close, and positive when they are too far apart. A simplification makes the method stochastic by sampling the population of possible pairs. This stochastic version considers a pair of locators and adjusts their positions based only on their contribution to h. The stochastic, pair-based method may be expressed as:
1) Select a pair of locators, i and j.
2) For each dimension, x, in the geometrical representation,
   2.1) Compute $h_{[x]i,j}=k(x_j-x_i)(1-a_{i,j}/g_{i,j})$
   2.2) Set $x_i$ to $x_i+h_{[x]i,j}$
   2.3) Set $x_j$ to $x_j-h_{[x]i,j}$
3) Go to 1.

Preferably, the factor $(1-a_{i,j}/g_{i,j})$ is computed outside the loop.

The stochastic version of the method provides benefits at the expense of randomness inherent in stochastic algorithms. The advantages include, smaller portions of work per iteration, with constant time complexity; the opportunity to draw the pair of locators from a sample of the total population; and the sample of pairs available may be created with a specific, and possibly useful bias.

The method of this particular preferred embodiment requires a reliable estimation of $a_{i,j}$ as given by $f^{-1}(b_{i,j})$.

A Mathematical Model of the ab Relationship

The extraction of spatial information from behavioural information will generally rely upon the existence of spatial redundancy in a set of signals. In a particularly preferred embodiment of the invention, it is assumed that the closer together that two referents are in reality, the more similar their signals are likely to be.

It is instructive to consider two referents with no signal correlation. Given two like referents, it is possible to construct a notion of difference of signals. For example, if the referents have binary states, then we may say that they have difference of zero when they are both in the same state, and difference of one otherwise. With respect to the following formulation it is not important how many states the referents may have, merely that there is a statistic that captures the difference of.

A statistic, $\mu$, may be defined which measures the expected difference between signals from a pair of referents where there is no signal correlation. In a preferred embodiment, to calculate $\mu$ for a pair of referents i and j, all that is required is the probability distribution of their values, $p_i(v)$ and $p_j(v)$ respectively. If the referents produce discrete signals then $\mu$ may be expressed formally as:

$$\mu = \sum_x \sum_y p_i(x) p_j(y) |x-y| \quad (11)$$

Using the example of a pair of binary referents, where each state is equally likely, then:

$\mu=(0.5\times 0.5\times 0)+(0.5\times 0.5\times 1)+(0.5\times 0.5\times 0)+(0.5\times 0.5\times 1)=0.5$ As another example, for referents with equally likely values from 0 to 255, $\mu$ may be expressed as:

$$\mu = \frac{1}{256^2} \sum_{i=0}^{255} \sum_{j=0}^{255} |i-j|$$

$$= \frac{21845}{256}$$

$$\approx 85.3$$

For referents that report real-number values, the equivalent formulation of $\mu$ requires knowledge of the probability density functions, $p_i(v)$ and $p_j(v)$. The value $\mu$ may then be expressed as:

$$\mu = \int_{-\infty}^{\infty} \int_{-\infty}^{\infty} p_i(x) p_j(y) |x-y| \, dx \, dy \quad (12)$$

When signals from the referents have some correlation, then the actual measure of behavioural difference, b, will be less than µ. If the signals are anti-correlated, then b will be greater than that determined by the formulation of µ.

It is also instructive to consider the effect that the distance, a, between the two referents has in relation to the estimation of expected difference. For this purpose, the world may be considered to be divided into regions such that if the referents are in the same region, then the referents have zero difference. Furthermore, for the purpose of this example, it will be assumed that regions are randomly distributed in space such that region boundaries are encountered with an average frequency of λ per unit distance.

Given that the two referents are separated by a distance, a, the probability that there are n region boundaries between them, $P_n$, may be expressed by the Poisson distribution:

$$P_n = \frac{(\lambda a)^n e^{-\lambda a}}{n!} \tag{13}$$

The probability that the two referents are in the same region is the probability that there are no region boundaries between them, thereby enabling $P_n$, to be expressed as:

$$P_{n=0} = e^{-\lambda a} \tag{14}$$

The probability of straddling at least one region boundary may be expressed as:

$$P_{n \neq 0} = 1 - e^{-\lambda a} \tag{15}$$

When the referents do not straddle a boundary, the expected difference is zero. When the referents do straddle a boundary, the expected difference is µ. So the expected behavioural difference, b, as a function of a may be expressed as:

$$b = 0 \times P_{n=0} + \mu \times P_{n \neq 0} \tag{16}$$

$$= \mu(1 - e^{-\lambda a})$$

This equation (16) provides a prediction about the relationship between the behavioural difference and actual distance between a pair of referents. The parameters λ and µ scale the relationship.

The second source of behavioural similarity concerns referents which have overlapping sense regions. A mathematical model of this effect is confounded by the complex interactions which may occur when referents aggregate a region. However, it is instructive to consider referents, each of which take a weighted sum of theoretical, point-like readings. In this instance, the ab relationship is the weighted sum of the theoretical relationships between readings at points in space-time.

This has the effect of averaging b over the region (in space and time). The larger this area of averaging, the more reliable the ab relationship becomes.

Sensitivity to Parameters

Given the ab relationship (16), we can use the inverse formulation to provide an inferred distance, a', from measured behavioural difference, b, which may be expressed:

$$a' = \frac{-\ln\left(1 - \frac{b}{\mu'}\right)}{\lambda'} \tag{17}$$

The success of this inference will largely be influenced by the assumptions underlying the formulation and knowledge of the parameters λ' and, µ'. Parameter λ' is an estimate of the real λ, and parameter µ' is an estimate of the real µ.

Figure 2:
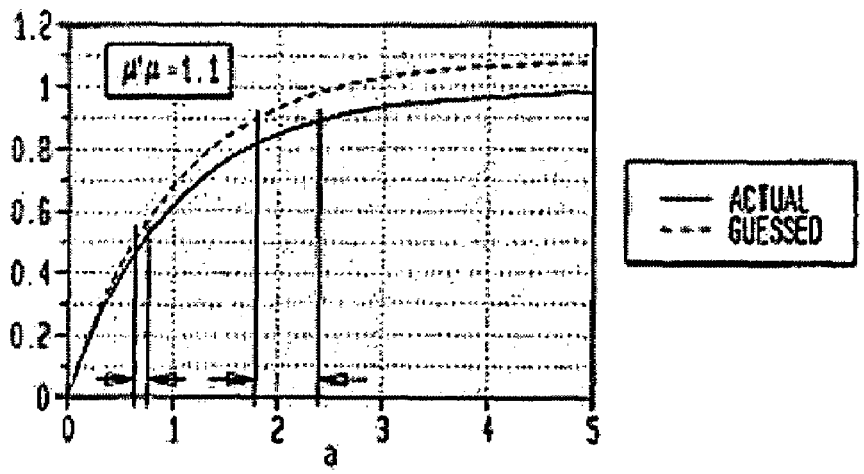
FIG. 2 is a representation of the ab relationship and the effect of incorrectly setting the parameter $\mu'$.

It is instructive to consider the effect on the inferred actual distance based on errors in setting λ' and µ'. FIG. 2 is a representation of the ab relationship and the effect of incorrectly setting the parameter µ'. In this instance, FIG. 2 represents an idealised ab plot and a plot of a' versus b when µ is overestimated by 10%. From the Figure, it can be seen that for small values of b, a' is underestimated by a small amount. For larger values of b, a' is underestimated by a disproportionately larger amount.

If the proportion of underestimation or overestimation of a' remains constant for all values of b, then a' would simply be proportional to a. If the ratio of a'/a is constant as λ' or µ' is varied, then the inferred geometrical representation is insensitive to that parameter (ignoring scale).

We can expand, a'/a, to be expressed as follows:

$$\frac{a'}{a} = \frac{\lambda}{\lambda'} \frac{\ln\left(1 - \frac{b}{\mu'}\right)}{\ln\left(1 - \frac{b}{\mu}\right)} \tag{18}$$

Considering the system's sensitivity to λ', it can be seen that varying λ' simply scales a' with respect to a. Consequently λ' can be set to some convenient constant. To analyse the affect of µ', we define an error ratio, err, as, $$err = \frac{\ln\left(1 - \frac{b}{\mu'}\right)}{\ln\left(1 - \frac{b}{\mu}\right)} \tag{19}$$

A plot of err versus b/µ illustrates how a' will be scaled for different measured behavioural differences. If this plot is a horizontal line then the scaling is constant. The more this plot varies from a horizontal line the more non-linear is a' with respect to a. By considering this plot for different values of µ'/,µ the sensitivity of the system to the parameter µ' is apparent.

Figure 3:
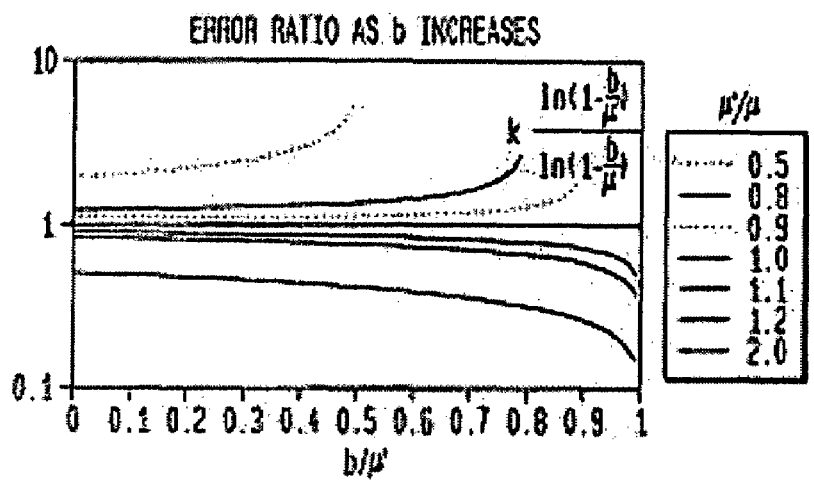
FIG. 3 is a representation illustrating the effect of over-setting or under-setting the parameter $\mu'$.

FIG. 3 is a representation illustrating the effect of over-setting or under-setting the parameter µ' and illustrates plots with µ'/µ set to various values. The plots illustrate that a' is only linear with respect to a when µ'/µ<1(i.e., µ has been correctly determined). When µ'/µ<1 (i.e., µ has been underestimated), then the relationship between a' and a is highly non-linear. In particular, for values of b which are greater than d there is no value for a'.

Figure 4:
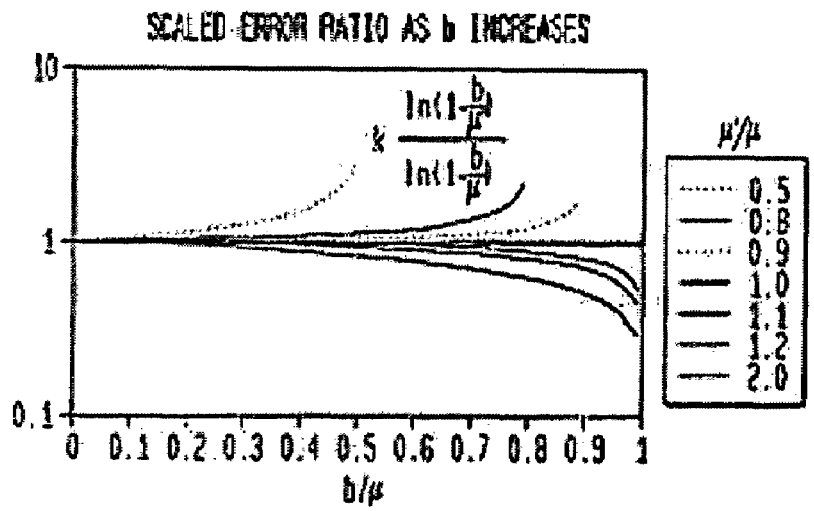
FIG. 4 is a representation illustrating the effect of over-setting or under-setting the parameter $\mu'$, ignoring any scaling factor, k.
Figure 13:
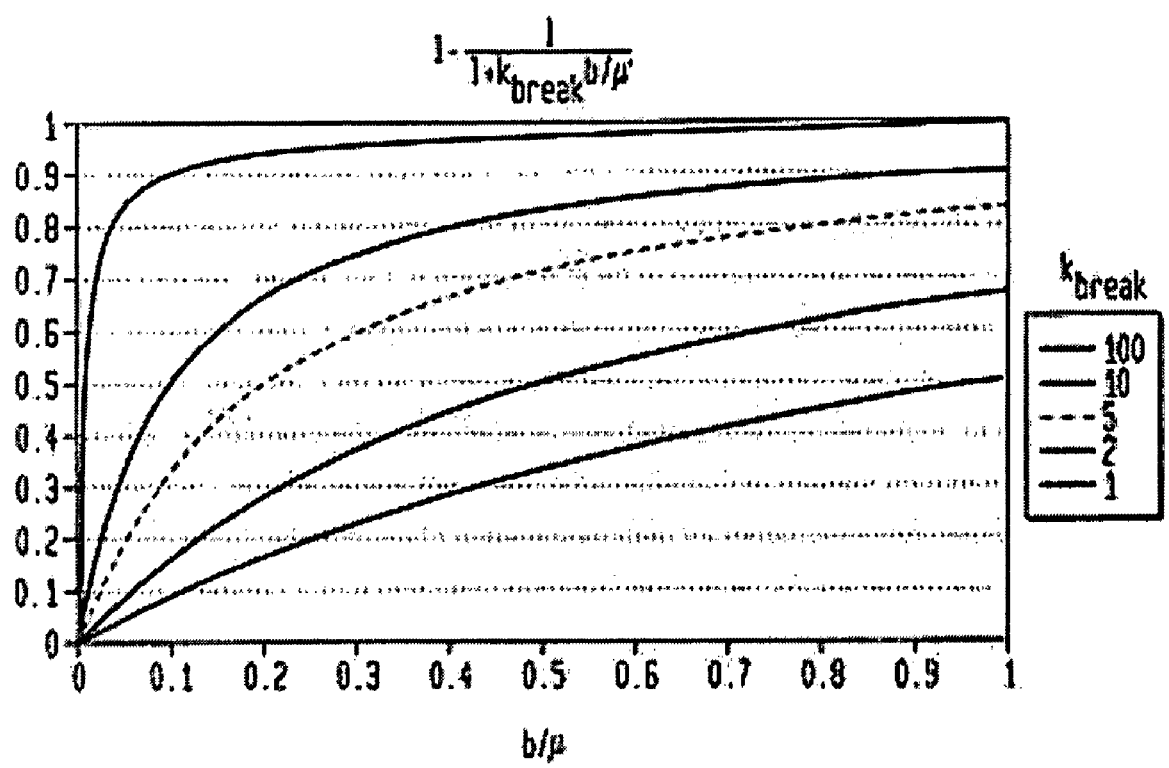
FIG. 13 is a representation of possible unit reassignment probabilities as a function of behavioural differences.
Figure 16:
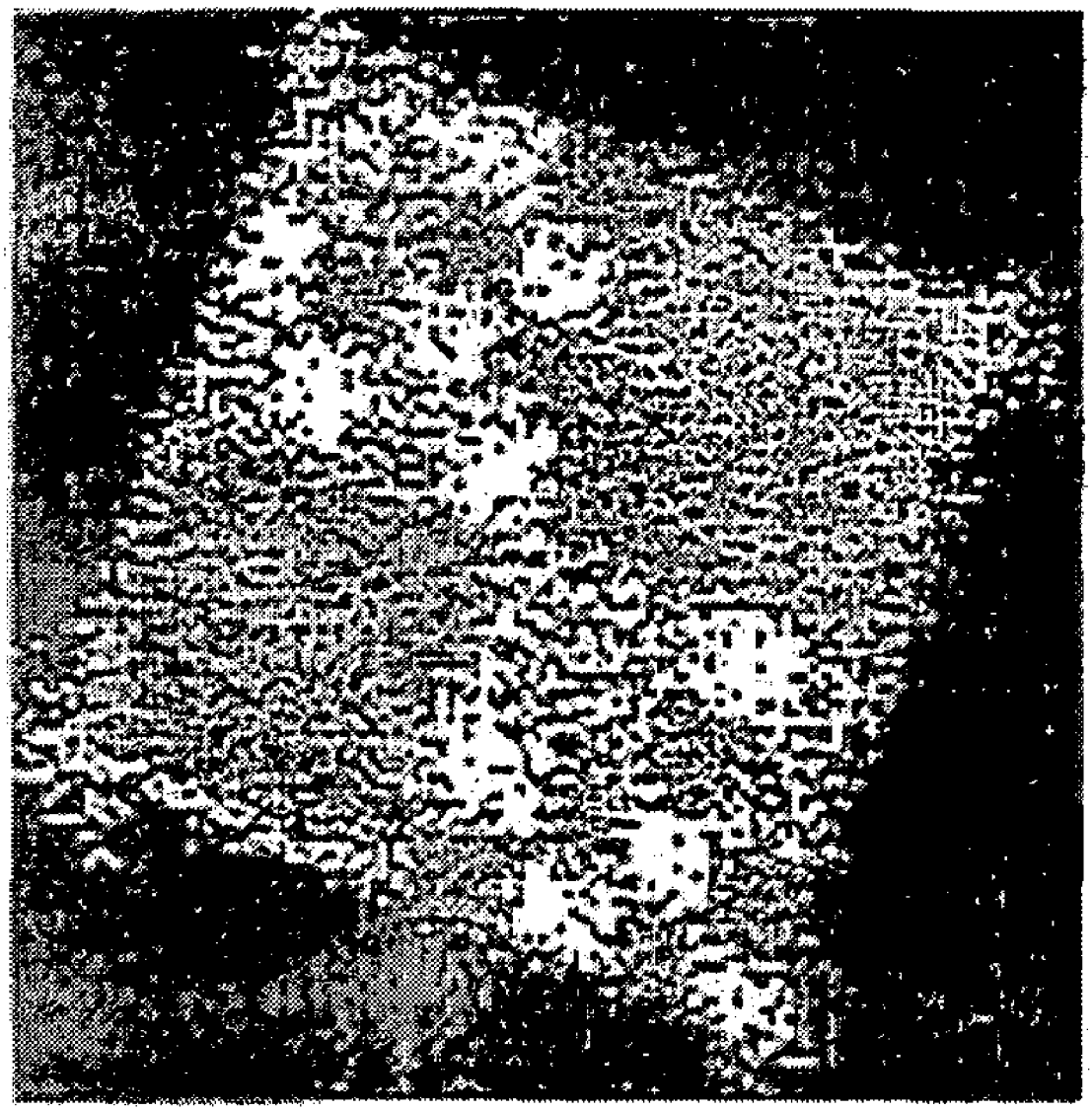
FIG. 16 is a representation of an image with "twists" removed.
Figure 17A:
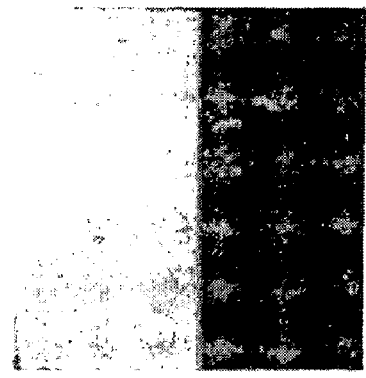
FIGS. 17a to 17h are a series of representations of images of activation waves (width=128) and the appearance of test images having been passed through developing geometries.
Figure 17B:
Figure 17C:
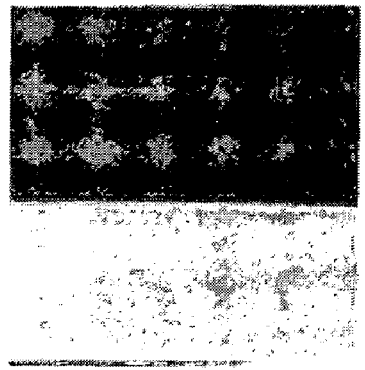
Figure 17D:
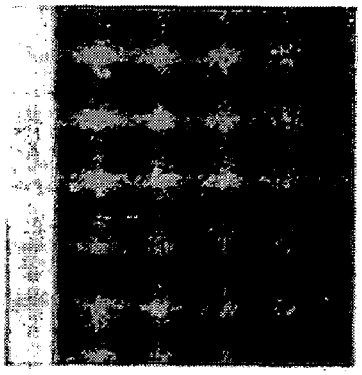
Figure 17E:
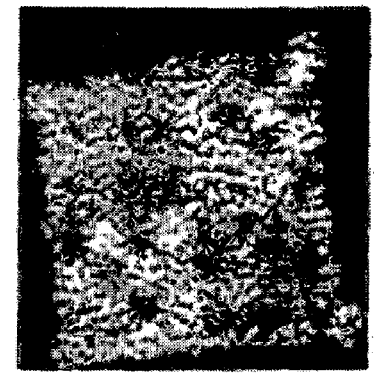
Figure 17F:
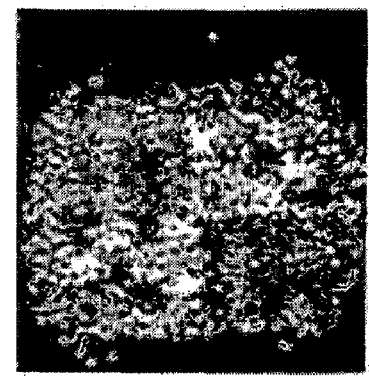
Figure 17G:
Figure 17H:
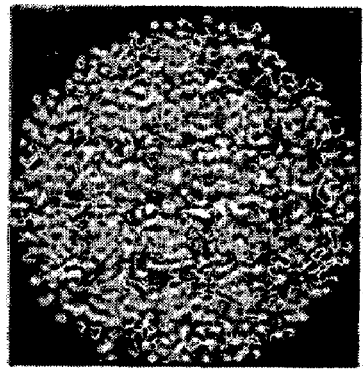

The non-linearity can be seen more clearly when the curves are normalised to an arbitrary scale, as illustrated in FIG. 4.

FIG. 4 is a representation illustrating the effect of over-setting or under-setting the parameter µ, ignoring any scaling factor, k. In this instance, the bottom curve in this plot shows the error ratio when assuming a very simple, linear ab relationship, $$a' = kb \tag{20}$$

where k is some arbitrary scaling constant. This curve provides a bound, a lower limit, on the error ratio when µ'>µ.

When, µ'/µ>1 (i.e. µ has been overestimated), the relationship between a' and a is slightly non-linear. The non-linearity is most pronounced for larger values of b where a' will be an underestimation.

Considering that it is better to overestimate s than to underestimate it, a conservative estimate may simply take the maximum possible difference between two signals. This will never be an underestimation and can never be worse than using a linear ab relationship. Considering the method's sensitivity to µ, it is useful to investigate how to obtain good estimates of µ.

The Effect of Changes in r, λ and µ on ab Plots

The primary variables with respect to the ab relationship that have been considered thus far are λ and µ. To this we can add a third, r, the range of sensor values. In this section, the relationship between image properties and these three variables is considered. Other less universal features in the ab curve are also considered. All these variables and characteristics apply to static images as they do to sequences of images. However, for the purposes of this specification, static images are predominantly used to illustrate visual effects.

FIGS. 5a, 5b, 5c and 5d are a representation as to how changing image contrast affects µ in the ab relationship.

The ideal ab curve is principally governed by two parameters, λ and µ. Of these, µ is a measure of the average contrast, and governs the height at which the ab curve flattens out. When we reduce the contrast in a scene, we expect to see a proportional reduction in µ. FIGS. 5a to 5d detail how the 20 photographic effect of contrast reduction affects µ (the asymptote falls from ~80 to ~30) but not λ (the horizontal scale of the curve does not change).

On the other hand, λ is a measure of the sharpness of an image, and determines how steeply the curve approaches the asymptote given by µ. This is because λ scales the ab curve horizontally, along the a axis, thereby compressing or extending the section of steepest gradient.

FIGS. 6a, 6b, 6c and 6d illustrate how blurring an image decreases λ and has a smoothing effect on the ab relationship. As the degree of blurring increases, the maximum height of the curve does not alter significantly, but its initial gradient is progressively reduced as λ decreases.

Extreme blurring results in very small values for λ and high correlation between actual distance and behavioural difference. Since low λ values can be obtained most readily from unfocused vision systems, it can be seen that an initial inability to focus an image may actually be conducive to recovering roughly localised positions. The method of the present invention is unusual in this respect as it benefits from such image degradation. This is in contrast to conventional calibration and orienting methods.

FIGS. 7a, 7b and 7c illustrate the effect of reduction in, resolution of sensor scale.

Reduction of r, the greyscale of a monochrome image, without reducing the contrast has noticeably little effect on the shape of the ab curve. The extent of the greyscale may be considered as the resolution of a referent scale. Illustrated in FIGS. 7a to 7c are three renditions of the same scene, the first with the original 220 shades of grey and two modified images in which the number of shades of grey are reduced to eight and two, respectively. The difference in chromatic resolution manifests itself as an exaggeration of the undulations of the ab curve, though the overall shape is not significantly changed. This exaggeration is detrimental as it can only increase the possibility of error.

In image processing, dithering is a method of reducing the number of colours, or greys, in an image. This consists of approximating an absent colour with an alternating pattern of two or more other colours. For instance, all greys can be approximated by a mix of black and white. With reference to FIG. 8, wherein the effect of dithering is illustrated in relation to the image of FIG. 7c, it should be noticed that the salient effect of dithering is to drastically and disproportionately increase the average behavioural difference, b, measured over an actual distance, a, of one pixel since the mixing involves the adjacent placement of different colours in an alternating pattern where before there may have been a single uniform colour. While the overall shape of the ab curve is relatively unaffected, it is no longer useful at small values of a (note the spike at the left end of the curve). As this part of the curve is often the most useful, it can be seen that dithering is problematical.

Variations of the ab Curve

Under ideal circumstances the ab curve is smoothly monotonic. However, it is instructive to consider the relationship between deviations from ideal circumstances and the visual effects that result from them.

Smoothness

If the ab curve were linear, then the method of the present invention would have relatively little difficulty in inferring a from b. The non-linear nature of the ab relationship makes estimates of a susceptible to errors as b approaches µ. When λ is small, however, the approach to the asymptote is relatively slow and the ab relationship is more stable. Consequently, the method of the present invention displays better performance with an ab curve with small λ, (i.e., whose initial gradient is small). Long, smooth gradients in an image correspond with a smooth ab curve.

FIG. 9 illustrates the effect of long smooth gradients in an image producing a smooth gradient in the ab relationship. The figure includes a plot of the standard deviation for the ab relationship of the image. The plot demonstrates that small differences at small distances are highly probable and that a large range of differences occur at the mid range. At extremely long distances, the data becomes highly variable due to small population sizes (which also cause a corresponding decrease in the reliability of the ab curve). In this image, standard deviation is relatively small at long distances because the corner areas are of similar tone. In this instance, λ is very small, and the ab curve extends across 200 pixels before beginning to deviate from its ideal form. This demonstrates that blurring is not necessary for low λ which can occur naturally in some scenes. The ab curve in this image also demonstrates a common property of photographs, namely small b at instances of large values.

Spikiness

The image in FIG. 10 is a magic square, in which all values of grey from 0 to 255 appear, and the total quantity of grey in each row, column, and diagonal is the same. Furthermore, all quadrants share an average, as do each of their quadrants, and so on, down to the level of areas measuring 2 by 2 pixels. So, due to the special way this image is constructed, all small areas have an equal amount of light and dark, and the distribution of greys is completely uniform (256 greys in 256 pixels). The average behavioural difference is 85 (as predicted by formula 29). This spatial and chromatic consistency causes relatively low standard deviation in behavioural difference at mid-range distances, as can be seen in the standard deviation plot.

FIG. 10 is a plot illustrating standard deviation in an image of constant local average. The extreme short and long distances in this image give consistently high behavioural differences This produces relatively high values for small and large values of a in the ab curve.

Nearly all distances of one pixel in the image of FIG. 10 have very high behavioural differences due to the chequerboard pattern. This accounts for the spike at a=1 in the ab curve. At a=21 the ab plot is measuring the differences over the longest distance in the image, which is its quantised diagonal. Inspection of the image itself reveals that across each diagonal there is a very high difference in luminance (the actual difference is 240−0=240 for top left to bottom right, and 255−15=240 for top right to bottom left). At a=20, one unit of distance less than the diagonal the behavioural difference is extremely small. This is because this part of the curve collects differences between one corner pixel and the two pixels adjacent to the opposite corner pixel. These differences are all very small, as can be seen by inspecting the image. In short, the highly unnatural pattern of local contrast in this image causes an unusually spiky ab curve.

However, the standard deviation plot of FIG. 10 provides an indication as to another source of spikiness in the ab curve. As all local areas share the same average grey, over middle distances we should expect to get rather uniform behavioural differences and this is illustrated in the curve. However, the plot of standard deviation shows a smooth section at mid-length distances. This is not due to reduced differences per se, and it would appear to be due to an increase in population sizes. In this image the actual distribution of distances is inversely related to the standard deviation of behavioural difference in this image.

The ab Curve's Immunity to Spatial Distortion.

It is instructive to investigate the effect spatial distortion has on the ab curve.

Proportionate Scaling

The effect of resolution change on the ab curve is illustrated in FIG. 11. The aspect ratio of the source image is unchanged. Each dimension has been reduced by a factor of four, so the pixel population has been reduced by a factor of 16. Both images have a very high λ, each containing many small high contrast shapes. The only differences detectable in the ab curves result from higher variability in, that of the lower resolution image, caused by a reduction in population size. This suggests that computation of an estimate of μ (i.e. μ') can be successfully accomplished using sparse sampling of the input population.

Disproportionate Scaling

FIG. 12 illustrates the effect of reducing an image in both dimensions, but by different amounts (from 128 to 100 pixels horizontally and from 96 to 30 pixels vertically). In this particular instance, both scale and aspect ratio have been altered but the ab curve is not significantly affected.

Dimensionality of Geometry

A significant decision in the implementation process is the number of dimensions that should be included in the system. Providing dimensions beyond what is assumed to exist in the space of the referents may provide extra freedom for an algorithm such as the gradient descent as it attempts to find a global minimum. A phenomenon has been noticed in some of the experiments to date where separate locally consistent patches of geometrical representation are not themselves mutually consistent. For a two dimensional geometrical representation, the result appears rather like a twist (refer FIG. 15). Sometimes the geometrical representation untwists by destroying one consistent patch and rebuilding it in reflection. Providing an extra dimension provides extra freedom for this "untwist" to occur. Extra dimensions may be added, and also removed if they are not required.

In some cases, less dimensions than assumed to exist in space as a reference may be required, and in this case a number of dimensions for processing can reduced.

Referent Population

The method of the present invention may achieve spatial organisation by first using only a subset of the referents, gradually introducing additional referents subsequently.

Workforce

When a pair of referents are selected for processing, the various statistics associated with that pair (i.e. b and μ') are brought to bear on their geometrical representation. As indicated below, there are a number of alternatives for evaluating the statistics and some of the sub-methods require additional memory and processing for each possible pair of referents.

For the purposes of this specification, the statistics associated with a pair are referred to as one "unit in the workforce" available to the gradient descent algorithm. Uncomplicated units that need no additional memory or processing do not impact on the complexity of the algorithm. For implementations requiring resources to compute statistics, there will be an impact, and in such cases, it makes sense to consider having fewer units than the total number of possible pairs.

Complete Workforce

A workforce that has one unit for each pair is referred to as a complete workforce. The number of units, w, required for a complete workforce over n sensors is $$w = \frac{n(n-1)}{2} \quad (21)$$

In this instance, each referent is associated with n−1 units. A complete workforce is useful when there are no processing requirements to maintain unit statistics, or when the number of referents is small. If the processing to maintain each unit is constant, then the complexity of each iteration is $O(n^2)$.

Sampled Workforce

Given that some of the techniques for obtaining b and μ require additional processing and memory, techniques using less than a complete workforce are thus considered. When the workforce consists of the entire population of possible pairs, there is a significant amount of redundancy in the statistics. In principle, a referent only requires three units to determine its correct position in a two dimensional geometrical representation. While in practice three units per referent is unlikely to produce good results, restricting the workforce to a fixed multiple of n may provide adequate results for particular tasks.

A workforce that is a subset of the population is referred to as a sampled workforce. If the number of units in the workforce is w, then the average number of units per referent is 2w/n, which is referred to as the order of the workforce. A complete workforce will be order n−1.

The advantage of a sampled workforce is the reduction in space and time complexity by having a constant order workforce (which is much less than order n−1). However, a gain is only achieved if actual memory and processing is required to maintain the units. This may not be the case when instantaneous values for b are used.

To implement a sampled workforce it is necessary to consider how a unit of the workforce is to be assigned to a particular pair of referents. A relatively simple approach is to assign the workforce to a random sample of the population. Various regimes may exist for assigning a sampled workforce. Starting with a randomly sampled workforce which is then evolved by occasionally reassigning units to new sensor pairs is one example.

Evolving a Sampled Workforce

It should be noted from the sensitivity analysis of parameters, and the empirical studies of the ab curve, that small values of b are more reliable than large values of b. An opportunity arises when using a sampled workforce to evolve the workforce to eliminate unreliable units.

In the preferred embodiment, the underlying sub-method for evolving the workforce includes the following steps:
1) Select a workforce unit, u, (with locators i and j).
2) Reposition i and j according to the gradient descent formulation.
3) With probability p, reassign u to a new pair of referents.
4) Go to 1.

Different evolution regimes affect the probability p, and the method for reassigning u.

The preferred approach when evolving the workforce is to prefer pairs which have smaller, more reliable values for b. Adopting this approach, the following equality for p is formulated.

$$p = 1 - \frac{1}{1 + k_{break} \frac{b}{\mu'}} \quad (22)$$

As the b statistic of a unit increases, so does the probability that the unit will be reallocated. The parameter, $k_{break}$, affects the likelihood that high b units are reassigned. FIG. 29 illustrates how this affects the workforce's preference for small b values.

Once it has been decided that a unit is to be redeployed, there remains the issue of how to reassign it. Simply reassigning a unit to a randomly chosen pair of locators ignores the principle of preferring small b values. Preferably, all possible pairs should be scanned and a pair chosen that has a small value for b. However, this approach has a number of complications.

Firstly, there is the computational expense of such a search. Secondly, and more significantly, there is the problem of evaluating b. The use of a sampled workforce is intended to reduce the computational expense dedicated to evaluation of b. If redeploying a unit requires b to be computed for every possible pair, any advantage as a result of reducing computational complexity may be lost.

An approach to overcome these problems, as implemented in the preferred embodiment, is to consider a small random sample of possible pairs. Then, using g as an indicator of b, assign the unit to the pair with the lowest g. Taking a sample avoids the necessity of checking every possible pair, and using g to indicate b avoids the time required to accumulate b.

Initially, the geometrical representation is unlikely to resemble the actual positions of the referents, so g is unlikely to be a good approximation of b. In this instance, basing redeployment on g may be no better than redeploying randomly. However, as the geometrical representation improves, there will be an approximately monotonically increasing relationship between g and b. This occurs as a result of the monotonically increasing relationship between a and b. When the redeployment sample size, $k_{tries}$, is 1 there is no preference for how a unit is reassigned. This is equivalent to randomly reassigning a unit. As $k_{tries}$, increases, redeployment prefers pairs with small value of g.

Selection of Units to Perform Adjustments to the Geometrical Representation

Considering how units in the workforce are selected to perform adjustments to the geometrical representation, three possible approaches are investigated, (1) a linear order, (2) a uniform random order, and (3) a biased random order.

A linear order is relatively straightforward. The units in the workforce are simply enumerated and an iteration process is commenced. This has the advantage of ensuring all units are processed equally, but has the disadvantages of requiring working memory to keep track of the next unit, and imposes an artificial, repetitive ordering.

A variation on the linear order is to randomly select a unit each time, and the most basic selection distribution treats all units uniformly. A uniform, random agenda simulates stochastic parallel processing where only one work unit can adjust the geometry at any one time.

Given that units can be randomly selected from the workforce, it may be useful to bias the selection in some way. One possible bias would be towards units with low b. A biased, random agenda could be useful for complete workforces where the units have no memory allocated (e.g. using instantaneous b values as opposed to accumulated b values).

A biased, random sample is an alternative approach to evolving the workforce. A random agenda may be biased in a similar manner to the biasing of unit redeployment (i.e using a parameter similar to $k_{tries}$).

Determining b

When executing a gradient descent algorithm, the actual distance, $a_{i,j}$, for a pair of referents, i and j must be estimated. This requires the algorithm to determine $b_{i,j}$ for the pair.

In the preferred embodiment, the value $b_{i,j}$ is the behavioural difference between signals of i and j, and it is as a result of comparing $b_{i,j}$ to the expected difference, $\mu$, that $a_{i,j}$ can be inferred.

A particular approach to determine $b_{i,j}$ is to take the difference in instantaneous values of the signals. The tacit assumption with such an approach is that the overall effect on the geometrical representation will have the effect of averaging the value of $a_{i,j}$. This assumes that the following square commutes:

$$\begin{array}{ccc} \hat{b} & \xrightarrow{average} & b \\ f^{-1} \downarrow & & \downarrow f^{-1} \\ \hat{a}' & \xrightarrow{average} & d \end{array} \quad (23)$$

In this square, $\hat{b}$ represents the measured, instantaneous difference between two signals. The vertical arrows represent the function using equation (17).

It is a relatively simple task to show that the square does not commute. The shape of the ab curve indicates that when an instantaneous $\hat{b}$ varies above b, there will be a disproportionately large effect on a', compared to instances where $\hat{b}$ varies below b. However, despite the fact that the square clearly does not commute, surprisingly good results are obtained from using such a simple approach.

To move from instantaneous values to accumulated values requires extra storage and processing time. A simple method for accumulating b uses an exponentially decaying average. The average at time t can be computed using the formula:

$$b_t = \gamma b_{t-1} + (1-\gamma)\bar{b}_t \quad (24)$$

where $\gamma$ is the decay rate and $\bar{b}_t$ is the instantaneous difference at time t.

It is important to select a suitable value for $b_o$ when the average needs to be initialised part way through processing. In the preferred embodiment, $b_o$ is set to the value that will result in $1-a'/g$ being equal to zero. That is, when the algorithm uses b to determine how to change the geometrical representation, there will be no change. As b accumulates its estimated value, its effect on the geometrical representation will become more significant.

The change to the geometrical representation will be zero when $g=a'$ $$g = -\ln\left(1 - \frac{b}{\mu'}\right) \quad (25)$$

Therefore, $b_o$ should be set using, $$b_o = \mu'(1-e^{-\mu}) \quad (26)$$

Determining $\mu$

The value $\mu$ is a statistic that measures the expected behavioural difference between two signals. The system uses a parameter, $\mu'$, to estimate $\mu$. It is by comparing $\mu'$ to b for a pair or sensors, using expression (17), that it is possible to arrive at an estimate, a', of the actual distance. If the distribution of values is known for signals i and j, then $\mu_{i,j}$ may be directly determined. If the probability of value v is $p_i(v)$ and $p_j(v)$ respectively, then $\mu_{i,j}$ can be expressed as:

$$\mu_{i,j} = \sum_x \sum_y p_i(x) p_j(y) |x-y| \quad (27)$$

In some systems, it may be possible to collect the distributions for each signal. This is a particularly attractive option for signals which report a small number of discrete values. For each signal, i, a vector, $p_i$ is required such that, $p_{i,v}$ is the probability of signal i measuring value v.

Accumulating the frequency data to estimate probabilities in this regard may be difficult. However, distributions can be accumulated in a time homogenous manner similar to exponentially decaying averages. The following algorithm decays each probability by a factor of $\gamma$. In the preferred embodiment, the total decayed amount is added to the probability for the current signal value. In this way, the area under the probability density function is conserved. The initial distribution could be uniform, in which case $P_{i,v}$ is initialised to $1/r$, where r is the number of possible signal values.

With decay rate $\gamma$, the update algorithm for $p_i$ is:
1) For each signal, i,
1.1) Set the decay total=0
1.2) For each value, v,
   1.2.1) Set the decay=$\gamma p_{i,v}$,
   1.2.2) Set $p_{i,v}=p_{i,v}$-decay
   1.2.3) Set total=total+decay
1.3) Let v be the current value of the signal, i
1.4) Set $p_{i,v}=p_{i,v}$+total If it is known that the values are uniformly distributed between 0 and r−1, then calculating $\mu$ simplifies to the following:

$$\mu = \frac{1}{r^2} \sum_{x=0}^{r-1} \sum_{y=0}^{r-1} |x-y| \quad (28)$$

$$= \frac{r^2-1}{3r}$$

$$\simeq \frac{r}{3}$$

This approximation holds for large values of r, and will not underestimate. In general, the expected difference for a pair of uniform discrete distributions (from $\alpha$ to $\beta$) is given by the following expression:

$$\mu_{i,j} = \sum_{x=\alpha_i}^{\beta_i} \sum_{y=\alpha_j}^{\beta_j} \frac{1}{(1-\beta_i-\alpha_i)} \frac{1}{(1+\beta_j-\alpha_j)} |x-y| \quad (29)$$

$$= \frac{\left(\begin{array}{c} |\alpha_i-\alpha_j| - |\alpha_i-\alpha_j|^3 + |\beta_i-\beta_j| - |\beta_i-\beta_j|^3 + \\ \alpha_i+\alpha_j-\beta_i-\beta_j+(1-\alpha_i+\beta_j)^3+(1-\alpha_j+\beta_i)^3-2 \end{array}\right)}{6(\alpha_i-\beta_i-1)(\alpha_j-\beta_j-1)}$$

For signals which report real-number values, the equivalent to expression (28) requires $p_i(v)$ and $p_j(v)$ to be the probability density functions for sensors. The formulation may then be expressed as:

$$\mu_{i,j} = \int_{-\infty}^{\infty} \int_{-\infty}^{\infty} p_i(x) p_j(y) |x-y| dx\, dy \quad (30)$$

Distributions for both discrete and continuous signals may be approximated by categorising values into groups of ranges, then using expression (28) over the mid-points of each range. In the most basic case, only two ranges exist, one from the minimum value to some threshold, and the other from the threshold to the maximum. This is similar to the representation of pictures as binary bit maps. Of course, the quality of such a simplification is highly dependent upon the choice of threshold value.

When real-number values are uniformly distributed between $\alpha$ and $\beta$, then $\mu$ has a direct solution which may be expressed as:

$$\mu_{i,j} = \int_{\alpha_i}^{\beta_i} \int_{\alpha_j}^{\beta_j} \frac{1}{(\beta_i-\alpha_i)} \frac{1}{(\beta_j-\alpha_j)} |x-y| dx\, dy \quad (31)$$

$$= \frac{3(\alpha_i\alpha_j+\beta_i\beta_j+\alpha_i\beta_j+\alpha_j\beta_i-\alpha_j^2-\beta_j^2) - 2(\alpha_i^2+\beta_i^2+\alpha_i\beta_i)}{6(\alpha_j-\beta_j)}$$

Expression (31) also becomes tractable when it is known that the values are normally distributed. Given the mean, $v_i$ and standard deviation, $s_i$ for each sensor, i, the normal distribution probability density function maybe expressed as:

$$p_i(x) = \frac{e^{\frac{(x-v_j)^2}{2s_i^2}}}{s_i\sqrt{2\pi}} \qquad (32)$$

By considering the z-scores of integration variables x and y, the expression can be simplified to:

$$\mu_{i,j} = \frac{1}{2\pi}\int_{-\infty}^{\infty}\int_{-\infty}^{\infty} e^{-\frac{1}{2}(x^2-y^2)}|(v_i+s_iy)-(v_j+s_jy)|\,dx\,dy \qquad (33)$$

Symmetries in the problem allow the expression to be further simplified by considering the expected difference of one signal from a zero point. This signal would have mean value, v, and standard deviation, s, given by, $$v=|v_i-v_j| \qquad (34)$$

$$s=\sqrt{s_i^2+s_j^2}$$

Then we have, $$\mu_{i,j} = \frac{1}{\sqrt{2\pi}}\int_{-\infty}^{\infty} e^{-\frac{1}{2}x^2}|v+sx|dx \qquad (35)$$

$$= \sqrt{\frac{2}{\pi}}e^{-\frac{1}{2}\left(\frac{v}{s}\right)^2} s + vErf\left(\frac{v}{\sqrt{2}s}\right)$$

The error function, Erf(x), is defined as the integral of the Gaussian distribution, $$Erf(x) = \frac{2}{\sqrt{\pi}}\int_0^x e^{-t^2}\,dt \qquad (36)$$

The solution to this integral may be approximated by the following expression:

$$Erf(x) \approx 1 - e^{-\sqrt{2x}} \qquad (37)$$

There are other methods for producing an accurate approximation to this integral, however, by using this approximation, $\mu_{i,j}$ may be expressed as follows:

$$\mu_{i,j} \approx \sqrt{\frac{2}{\pi}}e^{-\frac{1}{2}\left(\frac{v}{s}\right)^2} s + v\left(1 - e^{-\frac{v}{s}}\right) \qquad (38)$$

This approximation is used in the preferred embodiment as it will not overestimate μ by more than 0.025 v, nor underestimate it by more than 0.095 v.

The method of the present invention is sensitive to the parameter μ', and the various formulations above may be used to provide an estimate. Each formulation makes an assumption about the signals and consumes some processing power and memory. It should be noted that if only the signals' range is known, a relatively safe approach is to set μ' to the maximum possible difference between values. In this instance, it is likely that the approximation will always overestimate, however, in the absence of any other information this may be better than risking an underestimated μ'.

Accordingly, there are a number of possible sub-methods for obtaining μ'. The precise choice of sub-method for a particular circumstance will depend on the level of a priori knowledge the system designer has of the environment of the referents, the available computational power, and the required accuracy of the result. The advantages and disadvantages of employing the various sub-methods are summarised in Table 1.

TABLE 1

| Sub-Method | Repercussions |
| --- | --- |
| Domain Expert Given appropriate domain knowledge, set μ' to μ. | assumes μ is spatially uniform there is a risk that μ is underestimated such knowledge may not be available |
| Cheap and Safe Given only the signal range, set μ' globally to be the maximum possible b. | assumes, μ is spatially uniform μ cannot be underestimated μ will be overestimated |
| Economy Assume a particular distribution (uniform or normal). Compute and store the distribution parameters for each signal (e.g. mean and standard deviation). Use these to dynamically estimate μ. | does not assume μ is spatially uniform signal values may not have the assumed distribution extra processing power is required for each signal |
| Approximate Distributions Divide the signal range up into sub-ranges. Collect the distributions for the sub-ranges and use them to dynamically estimate μ. | does not assume μ is spatially uniform need to determine the ranges a priori extra processing power is required for each signal |
| Premium Collect the actual value distribution for each signal. Use them to dynamically estimate μ. | does not assume μ is spatially uniform does not assume a particular distribution processing requirements may be prohibitive |

Soft and Hard b Limits

Considering that large b values are less reliable than smaller values, it may be useful to reduce the effectiveness of units with large b. It has been previously noted that one method for preferring small b values is to evolve the workforce. Whilst this approach is not possible for complete workforces, an alternative is to limit the effectiveness of a unit according to b.

Any time the value of b is above μ', expression (17) cannot be computed. As a result, the particular unit is not effective. This can be extended by providing a hard cut-off value, $k_{cut}$, such that whenever b/μ' is greater than $k_{cut}$, no adjustment to the geoemtrical representation is made by that unit.

Implicitly the default value for $k_{cut}$ is 1. Any value less that 1 will reduce the effective workforce.

Rather than having a hard cut-off for b values, a softness factor can be included in the gradient descent algorithm such that as the value of b increases, the extent to which locators are re-positioned is reduced. In the preferred embodiment, the following relationship is used to determine softness:

$$\frac{1}{1+k_{soft}\frac{b}{\mu'}} \quad (39)$$

This particular relationship is similar to that of expression (23) for evolving the workforce. Softness is incorporated in the gradient descent algorithm of the preferred embodiment in the following way:
1) Select a pair of referents, i and j
2) Ascertain b, µ' and g for the pair
3) Use b and µ' to derive a' 4) Compute factor=k(1–a'/g)(1/ (1+$k_{soft}$b/µ'))
5) For each dimension, x, in the geometrical representation,
   5.1) Compute h=($x_j$–$x_i$) factor
   5.2) Set $x_i$ to $x_i$+h
   5.3) Set $x_j$ to $x_j$–h
6) Go to 1.

Other Hill Climbing Formulations

It will be recognised by those skilled in the art that the gradient descent algorithm is only one type of hill climbing algorithm and that other optimisation algorithms may work to approximate a with g. A significant factor in the gradient descent algorithm of the preferred, embodiment is the factor of h, namely:

$$1-\frac{a'}{g} \quad (40)$$

When g>a' the factor, as expressed in (40), is positive, which works to move the locators closer together. Conversely, when g<a' this factor is negative, which works to move them further apart. This can be conceptualised as a force that operates on the locators.

This expression has certain asymmetrical characteristics. For a given difference between a' and g, the conceptual force pushing locators apart is stronger than the conceptual force that would otherwise attract them.

Other algorithms have been considered and are summarised in Table 2.

TABLE 2

| | |
|---|---|
| $\ln\left(\frac{g}{a'}\right)$ | This formulation creates symmetry between the conceptual repulsive and attractive forces of a unit. The natural logarithm of the factor results in a conceptual force that is less than proportional to differences between a' and g. |
| g – a' | This formulation creates symmetry between the conceptual repulsive and attractive forces of a unit. The force is proportional to difference between a' and g. |
| $\frac{g}{a'}-1$ | For a given difference between a' and g, the a' conceptual force pushing locators apart is weaker than the conceptual force which would otherwise attract them. |

Summary of Computational Methods

There are a number of considerations when implementing the method of the present invention, including:
the dimensionality of the geometrical representation;
the population of referents to be processed and any variation in this regard;
the sub-method for determining b;
the sub-method for determining µ';
whether hard or soft limits will be used to ameliorate errors in b or µ', and if so, the parameters in this regard;
whether the workforce is the complete set of referent pairs or a sampled workforce; and
if the workforce is sampled, whether the workforce be evolved to ameliorate errors in b or µ', and if so, the evolution parameters in this regard.

Multi-Value Sensors

In some cases, each referent may provide a plurality of separate types of signal, providing a signal value for each type. Consider the case of colour CCD, wherein there is a separate pixel for three colour types. In this embodiment of the present invention, such "multi-value signals" can be processed in a number of ways:
1) Each separate type of signal can be treated as being associated with a separate referent, and a geometrical representation is provided for each type.
2) A separate locator is provide for each type of signal and the separate locators are then geometrically combined to produce a single locator.
3) The plurality of separate types are combined and treated as a single signal value.

Momentum

The motivation behind including momentum is similar to that for neural networks (Hertz, Krogh and Palmer, 1991, p 123). Using gradient descent with a small descent rate can be slow. Using a high descent rate the system can oscillate where the error-function includes narrow valleys. Adding momentum gives inertia to the path of the locator through the parameter space by including a portion of the change vector into the following change (see FIG. 21). The general form for gradient descent with momentum is:

$$H_t = -k\nabla \varepsilon(X_{t-1}) + \eta H_{t-1} \quad (1)$$
$$X_t = X_{t-1} + H_t$$

where η is the momentum parameter. It is common to set η in the range 0.2 to 0.8, however more sophisticated techniques vary η determined formulaically and come under the rubric of conjugate-gradient methods.

Figure 21A:
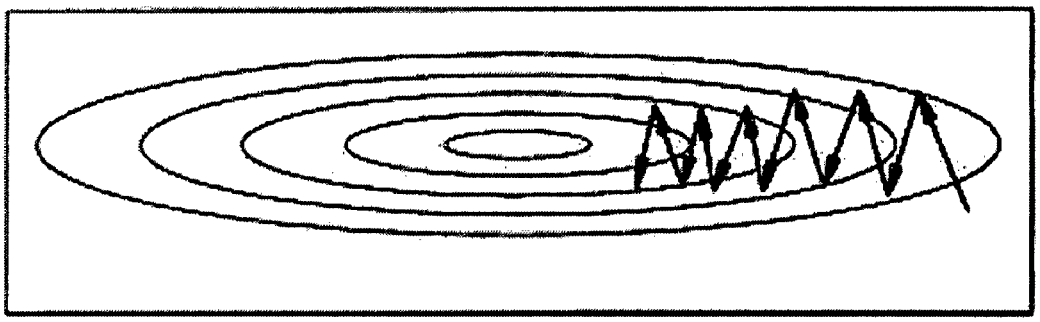
FIGS. 21a and 21b are diagrams illustrating application of momentum to a locator.
Figure 21B:
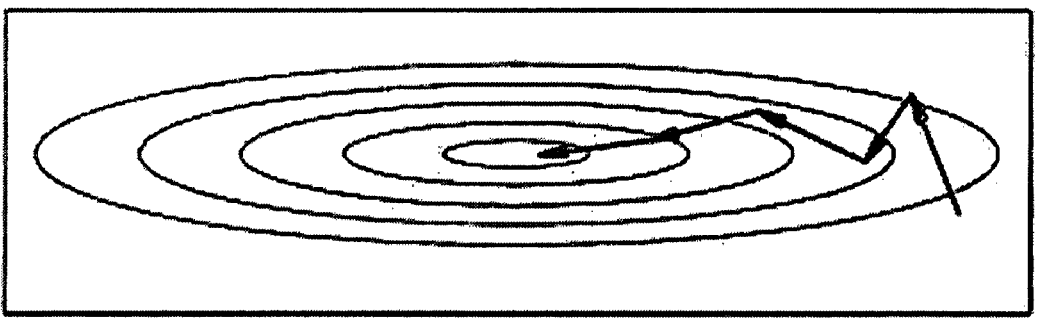

FIG. 21a shows a path over an error function with an error valley, without momentum. FIG. 21b shows the effect of including momentum.

To include momentum into the algorithm requires extra storage to remember the last change made. The stochastic gradient descent operates on units, making a pair-wise change at each step, so it would seem intuitive for each unit to store its previous change vector, $H_{i,j}$. In that case the algorithm is:
1. Select a unit (for pair of sensors i and j)
2. Compute the common factor φ=k(1–$a'_{i,j}$/$g_{i,j}$)
3. For each dimension, x, in the geometry,
   3.1 Set $h_{[x]i,j}$ to $\eta h_{[x]i,j}$+φ($x_{j-xi}$)
   3.2 Set $x_i$ to $x_i$+$\eta h_{[x]i,j}$
   3.3 Set $x_j$ to $x_j$–$\eta h_{[x]i,j}$
4. Go to 1.

However, this algorithm has two deficiencies. Firstly, it requires the storage of the H vector for each unit. Secondly, the momentum can be conceived as inertia for pushing a sensor's representation in the geometry, so is better considered as a property of the sensor representation, not of units.

To implement representation centred momentum, there is a vector $H_i$ to record the last update to a sensor's represented location. In that case, the algorithm becomes:
1. Select a unit (for pair of sensors i and j)
2. Compute the common factor $\phi = k(1-a'_{i,j}/g_{i,j})$
3. For each dimension, x, in the geometry,
   3.1 Set $h_{[x]i}$ to $\eta h_{[x]i} + \phi(x_j - x_i)$
   3.2 Set $h_{[x]j}$ to $\eta h_{[x]j} - \phi(x_j - x_i)$
   3.3 Set $x_i$ to $x_i + h_{[x]i}$
   3.4 Set $x_j$ to $x_j + h_{[x]j}$
4. Go to 1.

The number of sensors is much smaller than the number of units. Consequently, sensor based momentum allows the momentum to be more effective and saves memory. It is this notion of momentum which is currently implemented by JIGSAW.

The present invention provides an alternative system and method for representing the spatial structure of a plurality of referents as compared with conventional methods. When applied to the field of machine vision, the present invention provides a system and method that does not rely upon the conventional digital image description in which an image is described by a list of pixels in a notionally orthogonal matrix.

The present invention is not limited to applications in machine vision. A geometrical representation of any type of referent can be organised in accordance with the present invention.

A further embodiment will now be described in relation to an application for calibrating a motor sub-system to a sensor sub-system, by providing a geometrical representation of motor commands and in accordance with the present invention.

The following description will be given in relation to embodiments of a machine vision system, which includes an array of sensors in the form of a CCD array, mounted in a camera and where motor commands are used to change pan and tilt of the camera and therefore move the camera.

FIG. 18 illustrates an arrangement incorporating an apparatus for implementing an embodiment of the present invention. The arrangement includes a camera 1 and a motor arrangement 2. The motor arrangement 2 is arranged to change pan and tilt of the camera 1. In this embodiment the arrangement also includes a frame grabber 3 for buffering video signals from the camera CCD array, ready for sampling by processor 4. The processor 4 is programmed appropriately to implement the method steps of the present invention and also to provide motor commands to the motor arrangement 2. Control box 5 converts the processor's motor commands to drive pan and tilt motors 2.

There is a plurality of motor commands that can be performed by the motor unit 2. The performance of a particular motor command moves the camera 1, such that the gaze of the camera 1 is changed relative to the gaze immediately preceding the performance. The motor commands are generally approximately stable over time. Multiple performances of a motor command will generally affect the direction of gaze in the same way, with the exception of small random perturbations and slow drift in calibration.

In accordance with the present invention, in order to calibrate the motor sub-system (as represented by the processor 4, control box 5 and motors 2 in this embodiment) to the sensor sub-system (as represented by the CCD of camera 1 and frame grabber 3 in this embodiment), the processor 4 is programmed to represent motor commands in the geometrical representation. It does this by collecting signals from the CCD array both before and after the performance of any particular motor command and analysing the signals to position the motor command locator in the geometrical representation of the sensor space.

FIG. 19 is a geometrical representation 10, dots 20 schematically illustrating the positions of a plurality of sensor locators. It will be appreciated that there will generally (in a standard CCD array) be many more locators than shown here. FIG. 2 is for the purpose of illustration only.

In the present embodiments, a reference point F is selected. In this case the reference point encompasses a plurality of pixels. The method then seeks to position the motor command locators within the geometrical representation 10. For example, motor command locator A is shown positioned at $G_A$ within the geometrical representation 10 and motor command locator B is shown correctly positioned at point $G_B$ within the geometrical representation 10. Performance of the motor command A will cause the sensor sub-system to move until the reference point is gazing at the same area of the environment as was being gazed at by the sensors represented at point $G_A$ before performance of the motor command. Similarly for performance of the motor command B.

The locator of a motor command in the geometrical representation is positioned by using the behavioural difference of a sensor with a locator near the reference point and another sensor in the same way as the embodiment of the invention described above in relation to FIGS. 1 to 17.

The following discussion deals with this method in more mathematical detail. In order to deal with the (generally very large) numbers of referents that need to be processed, the present invention employs particular novel processing techniques. Two different types of processing techniques are described here as "Embodiment 1" and "Embodiment 2". The following general discussion applies to both.

Each time motor command m is performed, the system may collect samples of the signal values immediately before and after the performance. Let $v_{i,t}$ be the value of signal i at time t. Let start(m,k) be the start time of the kth performance of motor command m. Similarly let finish(m,k) be the finish time of the kth performance of motor command m. Using this notation, $v_{i,start(m,k)}$ is the value of signal i at the start of the kth performance of motor command m. And $v_{j,finish(m,k)}$ is the value of signal j at the finish of the kth performance of motor command m. This description allows the method to compare the "before" and "after" views of the world from the sensor sub-system.

Consider a point, $\phi$ in the geometrical representation. If motor command locator m is correctly positioned, at $G_m$ with respect to $\phi$, then performing m will move sensory information reported in the vicinity of $G_m$ to $\phi$. More precisely, performing m will move sensory information at position $G_i$ to the new position $G_j = G_i - G_m + \phi$. Rewording this fact: if m moves the sensory information from $G_i$ to $G_j$, then m's correct position is $G_m = G_i - G_j + \phi$.

The assumption of temporal redundancy implies that the new information at $\phi$ has a high probability of being the same as the old information in the vicinity of $G_m$. Since all signal values may be recorded at time start(m,k), it is possible to make good inferences about the actual location of $G_m$ from only one performance of m.

$\phi$ represents the reference point about which the motor sub-system is calibrated.

It is required by the method that the value $v_\phi$ be calculated for point $\phi$. To this end let F be a non-empty subset of sensor locators in the vicinity of $\phi$. In the simplest of embodiments F contains only one sensor locator—the one closest to $\phi$. It is possible to use a heuristic simplification which compromises between setting |F| to 1, yet still uses multiple sensor locators to evaluate $v_\phi$.

The method creates an estimate of the value of the reference point at $\phi$, $v_\phi$, by taking the linear combination over the values of the sensor locators in F. In general this is $$v_\phi = \frac{\sum_{j \in F} w_j v_j}{\sum_{j \in F} w_j} \quad (41)$$

The value $w_j$ is a measure of the ability of $v_j$ to be a predictor of $v_\phi$. Those skilled in the art will realise that this formulation preferably capitalises on natural spatial redundancy. Spatial redundancy means that the sensed value at one point in space can be used as a predictor for an unknown value at a different point in space. It is known that spatial redundancy exhibits an exponential relationship, consequently a possible formalisation of $w_j$ is $$w_j = e^{-\lambda \|G_j - \phi\|} \quad (42)$$

where $\lambda$ is a measure of the spatial redundancy.

For the purposes of this specification, it is useful to define the measure $r_{i,j}$ as the correlation between $v_{i,start(m,k)}$ and $v_{j,finish(m,k)}$ for each performance, k. As a result of temporal redundancy, the tensor r provides information on the likelihood that the part of the world sensed by i, following a performance of motor command m, will then be sensed by j.

To provide a continuously updated value for, $r_{i,j,m}$, exponentially weighted moving statistics can be used, with a smoothing rate of $\gamma$. Those statistics relating to motor command m can be updated each time m is performed. Thus at any time t, the particular value of r is that according to its last update, which can be formally defined as $$r_{i,j,m,t} = r_{i,j,m,finish(m,k)} \text{finish}(m,k) \leq t < \text{finish}(m,k+1) \quad (43)$$

The individual values of r are a function of various collected statistics. Those skilled in the art will know that correlation can be measured using product-moment correlation. In this case $r^2$ can be expressed using $$r_{i,j,m,finish(m,k)} = \quad (44)$$

$$\frac{[v''_{i,j,m,k} - v'_{start,i,m,k} v'_{finish,j,m,k}]}{\sqrt{[vv'_{start,i,m,k} - (v'_{start,i,m,k})^2][vv'_{finish,j,m,k} - (v'_{start,j,m,k})^2]}}$$

In which case, following a performance of m, all the statistics relating to m used in equation (44) can be incrementally updated as follows. The signal statistics are updated using, $$v'_{start,i,m,k} = (1-\gamma) v_{i,start(m,k)} + \gamma v'_{start,i,m,k-1} \quad (45)$$

$$v'_{finish,i,m,k} = (1-\gamma) v_{i,finish(m,k)} + \gamma v'_{finish,i,m,k-1} \quad (46)$$

$$vv'_{start,i,m,k} = (1-\gamma) v_{i,start(m,k)}^2 + \gamma vv'_{start,i,m,k-1} \quad (47)$$

$$vv'_{finish,i,m,k} = (1-\gamma) v_{i,finish(m,k)}^2 + \gamma vv'_{finish,i,m,k-1} \quad (48)$$

The signal pair statistics are updated for a pair of signals i and j using, $$v''_{i,j,m,k} = (1-\gamma) v_{i,start(m,k)} v_{j,finish(m,k)} + \gamma v''_{i,j,m,k-1} \quad (49)$$

These statistics can be used to provide a measure of behavioural difference between two signals, across the performance of a motor action.

Embodiment 1

At any given time, a locator has both a position in the geometrical representation space and a signal value. The history of the signal value is instrumental in determining the locator position. A motor command locator has a position in the geometrical representation, but does not per se provide a value.

However, by virtue of temporal redundancy, it can be assumed that $v_\phi$ at finish(m,k) can be retrospectively assigned to the motor command m at start(m,k). In effect, the performance of a motor command, m, and the subsequent collection of $v_\phi$, enable the processing of the motor command, m, as if it were a sensor with a value.

Once a motor command is assigned a value and is redefined as a kind of sensor, it can be positioned in the geometrical representation as if it were a sensor. Such positioning is defined by the methods discussed above in relation to the first embodiment. A summary of the method follows.

A pair of referents is selected by one of several methods, one of which is random selection. The behavioural difference, b, between their signals is calculated (e.g., b=1−r, as specified above). From the behavioural difference a new value, a', the estimated actual distance between the referents, is calculated using a formula of the form:

$$a' = \frac{-\ln(1-b)}{\lambda'} \quad (50)$$

where $\lambda'$ is the estimated measure of spatial redundancy in the signals. This estimated measure governs the scaling of the geometrical representation that is constructed by the method discussed above.

Once a' has been calculated, the positions of the two locators can be adjusted so that the geometrical distance between them approaches a'. The outcome of many such adjustments made within an optimisation process seeking to minimise the error in locator positions is a spatially coherent geometrical representation of the actual positions of referents.

It can be seen by those skilled in the art that a motor command with a value can perform all that is required of a sensor in this method. Thus a set of motor commands with assigned values and a set of sensors can be represented by the method discussed above as a single population of locators. The sensor locators need not be spatially coherent at the outset. Organisation of the motor command locators can proceed in parallel with organisation of the sensor locators.

The computational complexity, for both time and space, of calibrating M motor commands to N sensors is O(M+N). This is therefore a low complexity algorithm.

There are two separate processes that work to position locators. The first process collects statistics to produce b and hence a' for pairs of locators. The second process works to optimise the position of the locators such that the distance between the locators, g, is proportional to a' for the pair. As per the methods of the present invention, a pair of locators is called a "unit", and the plurality of all units is called the "workforce". When the workforce is defined, units are preferably included which include one sensor locator and one motor locator. The discussed above in relation to the first embodiment describe the process for optimising the position of locators.

Those skilled in the art will realise that the b value for a unit, of which one locator is a motor command, can only be updated after a performance of that motor command. Without loss of generality, it can be defined that the latest motor command, m, started at time t−1 and finished at time t. In a particular embodiment, units relating to m can be updated using the following steps:

---

Record all sensor signal values, i.e., for all i, let $v_{i,t-1} = v_{i,t}$
Perform motor command m (which updates $v_{i,t}$)
Obtain the set of sensor locators, F, which has centre $\phi$
Let sum = 0
For all sensor locators j in F
    Let sum = sum + $v_{j,t}$ * exp (−λ' * dist ($G_j$, $\phi$))
End for
Let $v_\phi$ = sum / |F|
For all units, u, which include a locator for m
    Let i be the sensor locator included in u
    Let d = |$v_{i,t-1}$ − $v_\phi$|
    Set $b_u$ = (1 − γ * $b_{u + γ * d}$
End for
For a number of units, u
    Compute $a'_u$ = −ln (1 − $b_u$) / λ'
    Adjust the positions of the locators of u
    such that $g_u$ approaches $a'_u$
End for
Repeat from the start

---

Embodiment 2

Above, it was noted that if motor command m moves the sensory information from $G_i$ to $G_j$, then m's locator has correct position $G_m = G_i − G_j + \phi$. Furthermore, the measure $r_{i,j,m}$ was defined as the correlation between $v_{i,start(m,k)}$ and $v_{j,finish(m,k)}$ for each performance, k. Those skilled in the art will understand that $r_{i,j,m}$ can be used to infer an estimate of the probability that the information at sensor i is moved to sensor j as a result of m, so $G_m$ can be estimated using r as the weight in a weighted average over all possible sensor locators in the geometrical representation. This is formalised as, $$G_m = \frac{\sum_{i,j} r_{i,j,m}^2 (G_i - G_j + \phi)}{\sum_{i,j} r_{i,j,m}^2} \qquad (51)$$

To use this formulation as presented may be computationally expensive. If there are M motor commands and N sensors, the dimensionality of r is N×N×M. For every pair of sensors, for every possible motor command the system would need to collect statistics to populate r.

In any case the following heuristic approximations can yield excellent results and form part of this specification.

The first simplification uses expected difference as a surrogate for correlation. This is computationally cheaper than correlation yet empirical results show it is quite adequate for the task. Let $d'_{i,j,m,k}$ be the exponentially decaying expected difference between signals i and j following the kth performance of motor command m. The correlation tensor can be approximated using $$r_{i,j,m,finish(m,k)} \approx 1 - \frac{d'_{i,j,m,k}}{\mu} \qquad (52)$$

where μ is a suitable scaling constant. A formula to update d' is simply $$d'_{i,j,m,k} = (1 - \gamma)|v_{i,start(m,k)} - v_{j,finish(m,k)}| + \gamma d'_{i,j,m,k-1} \qquad (53)$$

Although this simplifies the collection of statistics the overall complexity is still $O(N^2M)$. Those skilled in the art will note that the stated problem is concerned with bringing information to the reference point (centred at $\phi$). Consequently, sensor locators in the vicinity of $\phi$ are of particular interest after a motor command performance. Above, F was defined as a sub-set of sensor locators in the vicinity of $\phi$. The dimensionality of r can be reduced to N×|F|×M by considering only those sensor locators in F on the completion of a performance. The estimation of the location for motor command locator m then becomes, $$G_m = \frac{\sum_{i \in S, j \in F} r_{i,j,m}^2 (G_i - G_j + \phi)}{\sum_{i \in S, j \in F} r_{i,j,m}^2} \qquad (54)$$

where S is the entire set of sensor locators and F is the reference point subset of locators.

From equation (54) it is possible to define the measure $r_{i,m}$ as the correlation between $v_{i,start(m,k)}$ and $v_{\phi,finish(m,k)}$ for each performance, k. The derivation then continues as above, arriving at an estimate of the location of motor command locator m using $$G_m = \frac{\sum_{i \in S} r_{i,m}^2 G_i}{\sum_{i \in S} r_{i,m}^2} \qquad (55)$$

In a particular embodiment the effects of the edges of the geometrical representation, combined with the simplification using the reference point subset, F, may cause a distortion in the estimate produced by (55). The reason is that the very spatial redundancy which allows the simplification to produce good results also produces a graded value of correlation, $r_{i,m}$, as the distance increases between $G_i$ and the correct location for m. The gradient of correlation, combined with the truncation of the gradient at the edge of the geometrical representation, may distort the weighted average in (55) such that $G_m$ is located further from the edge than its correct location.

A preferred embodiment may overcome this distortion using either of the two techniques described herewithin. The first technique discards all sensor locators that have a value of $r^2_{i,m}$ below some threshold from the calculation of $G_m$. The threshold can be selected such that the effects of edges are excluded from the calculation. In the extreme case, the threshold is set high as to only permit the sensor locator i with the highest value of $r^2_{i,m}$ for a particular motor command locator m, to provide the location of m, thus the estimation of $G_m$ is reduced to, $$G_m = G_i, \text{ with } i \text{ such that } r_{i,m}^2 = \max_j (r_{j,m}^2) \quad (56)$$

A second technique finds the location $G_m$ using minimisation of error between $r^2$ and a model function. For this technique the method assumes a model, parametric function, $f_\kappa$: $\mathfrak{R}^D \to \mathfrak{R}$, where D is the dimensionality of the geometrical representation and $\kappa$ is a vector of the same dimensionality. There may be other free parameters in f that may be ignored for the purposes of this specification, but may be available to the error minimisation method. The restrictions on $f_\kappa$ are that $f_\kappa(X)$ decreases monotonically as the distance between $\kappa$ and X, $\|X-\kappa\|$, grows, and that $f_\kappa(X)=f_\kappa(Y)$ when $\|X-\kappa\|=\|Y-\kappa\|$. Thus $f_\kappa$ defines a hill-like function centred on position $\kappa$. Using an optimisation means such as regression, the value of parameter $\kappa$ can be found that, for the particular motor command m, minimises a measure of the error between $r^2_{i,m}$ and $f_\kappa(G_i)$ over all sensor locators, i. An example error measure is the sum of squared errors, $$\sum_i (r_{i,m}^2 - f_\kappa(G_i))^2 \quad (57)$$

The position of motor command locator m can then be set, $G_m = \kappa$, for the value of parameter $\kappa$ which minimises the error, i.e., the hill-like function $f_\kappa$ fits the correlation statistics for m.

To position motor command locator m the system can have a measure, $p_{m,i}$, of the expectation that performance of the motor command will move information present at sensor i to the reference point. Given the set of measures for m for all the sensors, it is possible to place locator m near those sensor locators where $p_{m,i}$ is high. The method provides steps to collect $p_{m,i}$ for each m and i, and steps to position locator m in the geometrical representation based on these values. The method thus constructs a reliable geometrical representation for all motor commands.

Without loss of generality, it can be defined that the latest motor command, m, started at time t−1 and finished at time t. The method constructs an estimate, $p'_{m,i,t}$, for an indicator of the probability that motor command m moves the sensory information from sensor locator i to the point $\phi$ by summing over F. Each term of the sum can be weighted by a monotonically decreasing function of the distance from a reference point sensor locator to Using the weighting function in (42), the measure is formulated as $$p'_{m,i,t} = \sum_{j \in F} -|v_{i,t-1} - v_{j,t}| e^{-\lambda \|G_j - \phi\|} \quad (58)$$

The redundancies that would permit $p'_{m,i,t}$ to be used to position locator m are in general apparent after several performances of motor command m. Consequently the method can take an average over a number of trials. Respecting the principle of continuous calibration the method can use an exponentially weighted moving average. The update equation for $p_{m,i}$ is thus $$p_{m,i,t} = (1-\gamma)\left(\sum_{j \in F} -|v_{i,t-1} - v_{j,t}| e^{-\lambda \|G_j - \phi\|}\right) + \gamma p_{m,i,t-1} \quad (59)$$

After updating $p_{m,i}$ for motor command m, the locator can be repositioned so that it is closer to sensor locators with high $p_{m,i}$. Those skilled in the art will know that in general, the actual arrangement of sensors may also be dynamic. In which case all motor command locators can be repositioned whenever the sensor locators are repositioned.

A simple method to reposition locator m first establishes the threshold based on the range of $p_{m,j}$, $$p_{threshold,m} = \min_j [p_{m,i}] + \theta(\max_i [p_{m,i}] - \min_i [p_{m,i}]) \quad (60)$$

where $\theta$ is a chosen constant, preferably in the range 0 to 1.

The $p_{threshold,m}$ can provide a cut-off value, below which $p_{m,i}$ is ignored. The position of m can then be set as the weighted average of all the sensor locators with $p_{p,m} > p_{theshold,m}$.

$$G_m = \frac{\sum_{i, p_{m,i} > p_{threshold,m}} (p_{m,i} - p_{threshold,m}) G_i}{\sum_{i, p_{m,i} > p_{threshold,m}} (p_{m,i} - p_{threshold,m})} \quad (61)$$

In a particular embodiment, the method can be described using the following steps:

Record all sensor signal values, i.e., for all i, let $v_{i,t-1} = v_{i,t}$

Perform motor command m (which updates $v_{i,t}$)
Obtain the set of sensor locators, F, which has centre $\phi$
For all sensors locators, i
    Let sum = 0
    For all sensors locators j in F
        Let sum = sum − | $v_{i,t-1}$ − $v_{i,t}$ | * exp (−λ' * dist ($G_j$, $\phi$))
    End for
    Let $p_{m,i}$ = (1 − γ) * sum − γ* $P_{m,i}$
End for
Let threshold = $Min_i$ ($p_{m,i}$) + θ ($Max_i$ ($p_{m,i}$) − $Min_1$ ($P_{m,i}$))
Let sum = 0
Let $G_m$ = 0
For all sensor locators, i
    Let w = $p_{m,i}$ − threshold
    If w > 0 then
        $G_m$ = $G_m$ + w * $G_i$
        sum = sum + w
    End if
End for
$G_m$ = $G_m$/ sum
Repeat from the start

SUMMARY

The methods described above equally well apply to spaces of higher dimensionality. For example, given a means to extract depth from the sensor apparatus (e.g., two cameras using stereoscopic vision, or laser range finders), the geometrical representation may be constructed in a three-dimensional space. As the above described embodiment calibrates the motor sub-system to the same space as the sensor sub-system, the described methods can equally well calibrate depth-affecting motor commands, such as changing focal length, zoom, or physical movements of the sensing apparatus.

In summary, the above-described embodiment provides an alternative system and method for the continuous, automatic calibration of motor commands to a sensor field derived from one or more devices. When applied to the field of active machine vision, the present invention provides a system and method that does not rely upon the efforts of engineers to calibrate the motor commands affecting the system's gaze to the view received by the vision sub-system.

In the above description, embodiments of the invention have been described which relate to a machine vision system. It will be appreciated that any type of motor sub-system which is associated with a sensor sub-system can utilise the present invention for calibration. The present invention is not limited to arrangements where the sensor sub-system is a machine vision sub-system. A sensor system may be any sensor system for obtaining any information. For example, it may include a sonar sub-system, or a radar sub-system.

An embodiment of the invention may be usefully applied to systems with a distributed surveillance system where it is required to have a number of unmanned cameras which are robotically controlled in surveillance of an area. These may include security systems. They also may include systems including a robot designed for surveillance in a remote area.

The present invention may also be used to control multiple sensor sub-systems. For example, a robot may require a plurality of sensor systems. It may require pressure sensor sub-systems to maintain balance or control contact of a robot part with an object, audio sub-systems to direct audio sensors and vision sub-systems to direct vision sensors. These can all be controlled in accordance with embodiments of the present invention.

A plurality of on-board processors may be utilised to implement control of the plurality of sensor sub-systems for the robot or other apparatus, in accordance with the present invention.

The present invention may be applied to motor sub-systems associated with any sensor sub-system. The sensor sub-system may be for sensing any effect. The following is a list of example effects that may be sensed and with which the present invention may be utilised. This list is not limiting.

Vision; audio; tactile pressure; temperature; air pressure; odours; sonar; laser range finders; water pressure; turbulence; artificially generated sense data; humidity; chemical composition; material densities; radio waves; magnetic fields; seismic activity; genetic samples; linguistic patterns; demographic data; all meteorological data; financial transaction patterns; radiation levels.

The present invention can be applied to enable the provision of a geometrical representation for any type of referent, and is not limited to vision sensors, or indeed is not limited to sensors.

For example, the invention can be applied where the referents are not sensors at all, and are in fact data which has some spatial relevance. For example, data on environmental conditions from weather stations located over a country can be used, by way of the present invention, to determine the positions of the weather stations. In this case the data from the weather stations is the "signal" required by the present invention.

The invention can be applied in data mining to any data which has any spatial relevance. It may be used to show unsuspected anomalies in data.

Yet another application is in biological systems. Medical technology has not yet found a way to promote the organised regrowth of the optic nerve after trauma. Since there is as yet no prosthetic cure, this means that people whose optic nerves are damaged are condemned to blindness. The present invention is ideally suited to reorganising the millions of nerve inputs (which would be utilised as the "signals" required by the present invention) so that they reconnect to the brain and transmit copies of the pictures received by the retina of the eye. The present invention therefore has the potential to provide prosthetic sight to the blind.

Yet another application is in distributed surveillance. Now that surveillance systems are being linked by the Internet, and no longer fit the bounds of local security patrols, there is a need for these systems to be adaptable and self-calibrating so that they remain operational even when components such as cameras and pan-tilt units are moved, adjusted, replaced or otherwise changed. Systems that use object tracking and motion tracking are especially in need of continuous calibration. This may not be possible using convention methods, since the apparatus of the system that controls the sensor apparatus may be physically separated by great distances.

The present invention can ensure that camera field of view and pan-tilt motor control are continuously integrated so that any movement in a camera's field of view will be correctly matched by a corresponding repositioning of the camera.

The present invention also has application in robotics.

For example, for toy robots, low pricing, and fault-free performance in the field, life-like behaviour, are desirable attributes. The present invention can be utilised to implement robots that have these attributes.

Other types of robots (i.e. non-toy robots) are increasingly being deployed in dynamic environments, where autonomy (the ability to act independently) and ability to deal effectively with change) are more important than accuracy and repeatability. The new generation of robots can work in areas where it is prohibitively difficult, dangerous or expensive to send people. The present invention can be used to facilitate the autonomy and adaptability of such robots.

The present invention also has a wide range of applications in image processing. The invention provides an image-building platform, so it can be pre-processed for standard imaging processing solutions. If standard image input is not available, if multiple cameras require automatic integration, if the format of images needs verifying against a known model, then standard methods cannot work unless supported by the method of the present invention. Areas where the present invention may be particularly suited in image processing:

when the image has to be built from several sources (or cameras)

when the data is more complex than simple 2-dimensional image planes when the spatial sampling of the data causes unforeseen distortion and images It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of producing a geometrical representation of a plurality of referents in space, comprising a step of obtaining signals from a plurality of referents and a step of utilising the signals in order to provide the geometrical representation of the referents, wherein the step of utilising the signals includes predicating that differences in the signals from the referents imply an actual distance between the referents, in accordance with a theory of spatial redundancy, predicating that the differences in signals are related to the actual distance between the referents by a monotonically increasing function, predicating that the differences (b) in signals implies an actual distance (a) between the associated referents, and utilising the signal differences (b) to determine a geometrical distance (g) for locators constituting the geometrical representation, wherein the geometrical distance (g) is a function of the actual distance (a).

2. The in accordance with claim 1, wherein the step of obtaining signals includes the step of obtaining signals from sensors associated with the referents.

3. The in accordance with claim 2, wherein the referents are the sensors.

4. The in accordance with claim 3 wherein the sensors are one or more of the following type of sensor; light, pressure, sound, heat, motion, infrared, tension, radiation, sonar, range-finder, chemical, physical, electromagnetic, protein and molecular.

5. The in accordance with claim 2, wherein the referents are sources being measured by the sensors.

6. The in accordance with claim 1, wherein the step of utilising the signals comprises the further steps of quantifying an error ($\epsilon$) in the geometrical representation of the referents, and repositioning locators by changing the geometrical distance (g) between locators, with the intention of reducing $\epsilon$.

7. The in accordance with claim 6, wherein the step of utilising the signals to provide the geometrical representations of the referents, includes the step of repeating the method steps of claim 6 periodically.

8. The in accordance with claim 6, wherein the step of utilising the signals to provide the geometrical representation of the referents includes the steps of repeating the method steps of claim 6 continuously.

9. The in accordance with claim 8, wherein the step of repositioning the locators is implemented by way of a hill climbing algorithm.

10. The in accordance with claim 9, wherein, the hill climbing algorithm utilised is the gradient descent method.

11. The in accordance with claim 8, wherein the step of repositioning locators, includes the step of determining a momentum of locators within the geometrical representation, and repositioning the locators in dependence on the momentum.

12. The in accordance with claim 11 wherein the sensors are one or more of the following type of sensor; light, pressure, sound, heat, motion, infrared, tension, radiation, sonar, range-finder, chemical, physical, electromagnetic, protein and molecular.

13. The in accordance with claim 6, wherein the step of repositioning locators includes the step of sampling the possible population of referents and repositioning the locators corresponding to the sampled referents.

14. The in accordance with claim 13, wherein the step of sampling the possible population of referents, includes the step of sampling pairs of referents from a set of all possible parts of referents.

15. The in accordance with claim 14, wherein each pair of referents comprises a unit and wherein the number of units utilised comprises the workforce, the step of utilising the signals comprising the further step of determining a size of workforce to be used to provide signals to provide the geometrical representation of the referents.

16. The in accordance with claim 15, wherein the step of determining the size of the workforce includes the step of determining that the workforce will be a complete workforce, wherein there is one unit for each possible pair of referents.

17. The in accordance with claim 15, wherein the step of determining the size of the workforce includes the step of determining that the workforce will be an incomplete workforce, wherein the number of units is less than the number of all possible pairs of referents.

18. The in accordance with claim 17, wherein the workforce is constituted by an ordered selection of pairs of referents.

19. The in accordance with claim 18, wherein the workforce is constituted from samples of pairs of referents which are selected in accordance with their utility in effecting the geometrical representation of the referents.

20. The in accordance with claim 19, comprising the further step of reselecting pairs of referents to be included in the workforce in an evolving fashion on the basis of their utility.

21. The in accordance with claim 20, wherein a unit is considered to have a high utility, and is therefore more likely to be selected, if the signal difference b or the geometrical distance g of the unit is relatively small.

22. The in accordance with claim 20, wherein a unit is considered to have low utility, and is more likely to be deselected, if the signal difference b or the geometrical distance g of the unit is relatively large.

23. The in accordance with claim 17, wherein the workforce is constituted from random samples of pairs of referents.

24. The in accordance with claim 17, wherein the workforce is constituted from samples of pairs of referents which are selected in accordance with their utility in effecting the geometrical representation of the referents.

25. The in accordance with claim 15, wherein the step of utilising the signals comprises the further step of storing historical information about the difference (b) in signals of a unit.

26. The in accordance with claim 25, wherein the step of utilising the signal differences (b) to determine geometrical distance (g) for locators includes the step of utilising the historical information.

27. The in accordance with claim 1, wherein the step of utilising the signals comprises the further step of determining a statistic, $\mu$, which is a measure of the expected behavioural difference between signals from a pair of referents where there is no correlation between signals.

28. The in accordance with claim 27, wherein signal difference (b) values that are greater than $\mu$ are not utilised.

29. The in accordance with claim 27, wherein signal difference (b) values that are close to or at the value of $\mu$ are not utilised.

30. The in accordance with claim 27, wherein the steps of determining the statistic $\mu$, includes the step of determining $\mu$ for a pair or a subset of all possible pairs of referents.

31. The in accordance with claim 27, wherein the step of determining the statistic $\mu$, includes the step of determining $\mu$ for all possible pairs of referents.

32. The in accordance with claim 1, wherein each referent may provide a plurality of separate types of signal, providing a signal value for each type.

33. The in accordance with claim 32, wherein each separate type of signal is treated as being associated with a separate referent, and a geometrical representation is provided for each type.

34. The in accordance with claim 33, wherein a separate locator is provided for each type of signal, and the separate locators are then geometrically combined to produce a single locator.

35. The in accordance with claim 34, wherein the plurality of separate types are combined and treated as a single signal value.

36. The in accordance with claim 1, wherein for an n dimensional space of the referents, the method of utilising the signal comprises the step of providing n+m dimensional space within which to organise the geometrical representation.

37. The in accordance with claim 36, comprising the further step of subsequently reducing the geometrical representation to n dimensions.

38. The in accordance with claim 1, wherein for an n dimensional space of the referents, the method of utilising the signal comprises the step providing n−m dimensional space for the geometrical representation.

39. The in accordance with claim 1, wherein the referents are sources of data.

40. The in accordance with claim 39, wherein the sources of data are provided from a database.

41. The in accordance with claim 39, wherein the referents are sources of data relating to non-physical domains.

42. The in accordance with claim 1, wherein the referents are associated with motor commands for a motor sub-system.

43. The in accordance with claim 42, wherein the step of providing the geometrical representation includes the step of providing a geometrical representation of a plurality of sensors and providing a geometrical representation of the motor commands combined with the geometrical representation of the plurality of sensors.

44. The in accordance with claim 43, wherein the step of providing the positional representation of each motor command includes the step of dividing the motor command into a plurality of sub-motor commands, and positioning a locator for each of the sub-motor commands in the geometrical representation.

45. The in accordance with claim 1, wherein the referents are biological neurons.

46. A computer program embodied in a computer readable medium, for controlling a computer to implement the in accordance with claim 1.

47. An apparatus for producing a geometrical representation of a plurality of referents in space, comprising means for obtaining signals from a plurality of referents and means for utilising the signals in order to provide the geometrical representation of the referents, wherein the means for utilising the signals is arranged to predicate that differences in the signals from the referents imply an actual distance between the referents, in accordance with a theory of spatial redundancy, wherein the means for utilising the signals is arranged to predicate that the differences in signals are related to the actual distance between the referents by a monotonically increasing function and wherein the means for utilising the signals in order to provide a geometrical representation of the referents, is arranged to predicate that the differences (b) in signals implies an actual distance (a) between the associated referents, and is arranged to utilise the signal differences (b) to determine a geometrical distance (g) for locators constituting the geometrical representation, wherein the geometrical distance (g) is a function of the actual distance (a).

48. The in accordance with claim 47, wherein means for obtaining signals includes sensors associated with the referents.

49. The in accordance with claim 48, wherein the referents are the sensors.

50. The in accordance with claim 49 wherein the sensors are one of more of the following type of sensor; light, pressure, sound, heat, motion, infrared, tension, radiation, sonar, range-finder, chemical, physical, electromagnetic, protein and molecular.

51. The in accordance with claim 48, wherein the referents are sources being measured by the sensors.

52. The in accordance with claim 51 wherein the sensors are one of more of the following type of sensor; light, pressure, sound, heat, motion, infrared, tension, radiation, sonar, range-finder, chemical, physical, electromagnetic, protein and molecular.

53. The in accordance with claim 47, wherein the means for utilising the signals is arranged to quantify an error ($\epsilon$) in the geometrical representation of the referents, and reposition locators by changing the geometrical distance (g) between locators, with the intention of reducing $\epsilon$.

54. The in accordance with claim 53, wherein the means for utilising the signals is arranged to sample the possible population of referents and reposition the locators corresponding to the sampled referents.

55. The in accordance with claim 54, wherein the means for utilising the signals is arranged to sample pairs of referents from a set of all possible parts of referents.

56. The in accordance with claim 55, wherein each pair of referents comprises a unit and wherein the number of units utilised comprises the workforce, the means for utilising the signals being arranged to determine a size of workforce to be used to provide signals to provide the geometrical representation of the referents.

57. The in accordance with claim 56, wherein the means for utilising the signals is arranged to determine that the workforce will be a complete workforce, wherein there is one unit for each possible pair of referents.

58. The in accordance with claim 57, wherein a unit is considered to have low utility, and is more likely to be deselected, if the signal difference b or the geometrical distance g of the unit is relatively large.

59. The in accordance with claim 56, wherein the means for utilising the signals is arranged to determine that the workforce will be an incomplete workforce, wherein the number of units is less than the number of all possible pairs of referents.

60. The in accordance with claim 59, wherein the workforce is constituted by an ordered selection of pairs of referents.

61. The in accordance with claim 59, wherein the workforce is constituted from random samples of pairs of referents.

62. The in accordance with claim 61, wherein the workforce is constituted from samples of pairs of referents which are selected in accordance with their utility in effecting the geometrical representation of the referents.

63. The in accordance with claim 61, wherein the workforce is constituted from samples of pairs of referents which are selected in accordance with their utility in effecting the geometrical representation of the referents.

64. The in accordance with claim 62, wherein the means for utilising the signals is arranged to reselect pairs of referents to be included in the workforce in an evolving fashion on the basis of their utility.

65. The in accordance with claim 64, wherein a unit is considered to have a high utility, and is therefore more likely to be selected, if the signal difference b or the geometrical distance g of the unit is relatively small.

66. The in accordance with claim 56, wherein the means for utilising the signals is arranged to store historical information about the difference (b) in signals of a unit.

67. The in accordance with claim 66, wherein the means for utilising the signal differences (b) to determine geometrical distance (g) for locators is arranged to utilise the historical information.

68. The in accordance with claim 53, wherein the means for utilising the signals is arranged to quantify the error ($\epsilon$) and reposition the locators periodically.

69. The in accordance with claim 53, wherein the means for utilising the signals to provide the geometrical representation of the referents is arranged to quantify the error ($\epsilon$) and reposition the locators continuously.

70. The in accordance with claim 69, wherein the means for utilising the signals is arranged to apply a hill climbing algorithm.

71. The in accordance with claim 70, wherein the hill climbing algorithm utilised is the gradient descent method.

72. The in accordance with claim 47, wherein the means for utilising the signals is arranged to determine a statistic, $\mu$, which is a measure of the expected difference between signals from a pair of referents where there is no correlation between signals.

73. The in accordance with claim 72, wherein signal difference (b) values that are greater than $\mu$ are not utilised.

74. The in accordance with claim 72, wherein signal difference (b) values that are close to or at the value of $\mu$ are not utilised.

75. The in accordance with claim 72, wherein the means for utilising the signals is arranged to determine $\mu$ for a pair or a subset of all possible pairs of referents.

76. The in accordance with claim 72, wherein the means for utilising the signals is arranged to determine $\mu$ for all possible pairs of referents.

77. The in accordance with claim 47, wherein each referent may provide a plurality of separate types of signal, and wherein the means for obtaining signals is arranged to obtain a signal value for each type.

78. The in accordance with claim 77, wherein the means for utilising the signals is arranged to treat each separate type of signal as being associated with a separate referent, and to provide a geometrical representation is provided for each type.

79. The in accordance with claim 77, wherein the means for utilising the signals is arranged to provide a separate locator for each type of signal, and to geometrically combine the separate locators to produce a single locator.

80. The in accordance with claim 77, wherein the means for utilising the signals is arranged to combine the plurality of separate types and treat them as a single signal value.

81. The in accordance with claim 47, wherein for an n dimensional space of the referents, the means for utilising the signal is arranged to provide n+m dimensional space within which to organise the geometrical representation.

82. The in accordance with claim 81, wherein the means for utilising the signals is arranged to subsequently reduce the geometrical representation to n dimensions.

83. The in accordance with claim 47, wherein for an n dimensional space of the referents, the means for utilising the signal is arranged to provide an n−m dimensional space for the geometrical representation.

84. The in accordance with claim 47, wherein the means for utilising the signals is arranged to determine a momentum of locators within the geometrical representation, and reposition the locators in dependence on the momentum.

85. The in accordance with claim 47, wherein the referents are sources of data.

86. The in accordance with claim 85, wherein the sources of data are provided from a database.

87. The in accordance with claim 85, wherein the referents are sources of data relating to non-physical domains.

88. The in accordance with claim 47, wherein the referents are associated with motor commands for a motor sub-system.

89. The in accordance with claim 88, wherein the means for utilising the signals is arranged to provide a geometrical representation of a plurality of sensors and to provide a geometrical representation of the motor commands combined with the geometrical representation of the plurality of sensors.

90. The in accordance with claim 47, wherein the referents are biological neurons.

91. A system comprising a motor sub-system and a sensor sub-system, and a means for calibrating the motor sub-system to the sensor sub-system, which is arranged to provide a positional representation associated with a motor command in a geometrical representation provided by the sensor sub-system.

92. A mobile robotic apparatus, comprising a system in accordance with claim 91.

* * * * *